(12) United States Patent
Kishigami

(10) Patent No.: US 11,199,619 B2
(45) Date of Patent: Dec. 14, 2021

(54) RADAR APPARATUS, POSITION ESTIMATION APPARATUS, AND POSITION ESTIMATION METHOD

(71) Applicant: Panasonic Intellectual Property Management Co., Ltd., Osaka (JP)

(72) Inventor: Takaaki Kishigami, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 391 days.

(21) Appl. No.: 16/353,681

(22) Filed: Mar. 14, 2019

(65) Prior Publication Data

US 2020/0225337 A1 Jul. 16, 2020

(30) Foreign Application Priority Data

Mar. 22, 2018 (JP) .............................. JP2018-055024

(51) Int. Cl.
*G01S 13/42* (2006.01)
*G01S 7/41* (2006.01)
*G01S 13/931* (2020.01)

(52) U.S. Cl.
CPC .............. *G01S 13/426* (2013.01); *G01S 7/41* (2013.01); *G01S 13/931* (2013.01)

(58) Field of Classification Search
CPC ........ G01S 13/426; G01S 7/41; G01S 13/931; G01S 2013/462; G01S 13/42
USPC ........................................................ 342/146
See application file for complete search history.

(56) References Cited

U.S. PATENT DOCUMENTS

| 6,429,804 B1* | 8/2002 | Kishida | .................. | G01S 13/34 |
| | | | | 342/70 |
| 2007/0013576 A1* | 1/2007 | Shingyoji | ............. | G01S 13/931 |
| | | | | 342/70 |
| 2010/0271254 A1* | 10/2010 | Kanamoto | ............ | G01S 13/931 |
| | | | | 342/27 |

(Continued)

FOREIGN PATENT DOCUMENTS

| JP | 2002107440 A | * | 4/2002 |
| JP | 2002-368663 A | | 12/2002 |

(Continued)

OTHER PUBLICATIONS

I. Ziskind and M. Wax, "Maximum likelihood localization of multiple sources by alternating projection," in IEEE Transactions on Acoustics, Speech, and Signal Processing, vol. 36, No. 10, pp. 1553-1560, Oct. 1988, doi: 10.1109/29.7543. (Year: 1988).*

(Continued)

*Primary Examiner* — Vladimir Magloire
*Assistant Examiner* — Alexander L. Syrkin
(74) *Attorney, Agent, or Firm* — Seed IP Law Group LLP

(57) ABSTRACT

In a position estimation processing unit, by using the reflected wave signal of an array composed of receiving antennas arranged in a first direction among a plurality of receiving antennas, a maximum likelihood value extraction unit extracts the angle of arrival of a reflected wave signal in a first direction. An angle spread detection unit detects the angle spread in the first direction around the angle of arrival by using the reflected wave signal of the array. A target height estimation unit estimates the position of the target in the first direction by using the angle of arrival and the angle spread.

7 Claims, 18 Drawing Sheets

(56) References Cited

U.S. PATENT DOCUMENTS

2014/0347208 A1* 11/2014 Schoor .................. G01S 13/42
342/133

FOREIGN PATENT DOCUMENTS

| JP | 2013-053946 A | 3/2013 | | |
|---|---|---|---|---|
| JP | 2014052187 A | * | 3/2014 | ............. G01S 13/88 |

OTHER PUBLICATIONS

J. Li and P. Stoica, "MIMO Radar with Colocated Antennas," in IEEE Signal Processing Magazine, vol. 24, No. 5, pp. 106-114, Sep. 2007, doi: 10.1109/MSP.2007.904812. (Year: 2007).*

Jian Li et al., "MIMO Radar with Colocated Antennas", IEEE Signal Processing Magazine, vol. 24, Issue:5, Oct. 15, 2007, pp. 106-114.

Ilan Ziskind et al., "Maximum Likelihood Localization of Multiple Sources by Alternating Projection", IEEE Transactions on Acoustics, Speech, and Signal Processing, vol. 36, No. 10, Oct. 1988.

J. Capon, "High-Resolution Frequency-Wavenumber Spectrum Analysis", Proceeding of the IEEE, vol. 57, No. 8, Aug. 1969, pp. 1408-1418.

* cited by examiner

RADAR APPARATUS, POSITION ESTIMATION APPARATUS, AND POSITION ESTIMATION METHOD

BACKGROUND

1. Technical Field

The present disclosure relates to a radar apparatus, a position estimation apparatus, and a position estimation method.

2. Description of the Related Art

To provide a high resolution image, radar apparatuses need to use a radar transmission signal having a short wavelength (including a microwave or a millimeter wave). In recent years, efforts have been under way to develop such radar apparatuses. Furthermore, to improve outdoor safety, radar apparatuses need to detect an object (a target) including a pedestrian in addition to a vehicle in a wide angle range. Efforts have been under way to develop such wide-angle radar apparatuses.

In general, wide-angle radar apparatuses have one of two configurations described below.

A first configuration is one to mechanically or electronically scan a pulse wave or a modulated wave by using a narrow angle directional beam (a beam width of several degrees) and transmit a radar wave. Thereafter, reflected waves are received by using a narrow angle directional beam. This configuration requires many scans to obtain high resolution. As a result, the performance of tracking a high-speed moving target deteriorates.

A second configuration is one to employ a technique of receiving reflected waves by an array antenna composed of a plurality of antennas (antenna elements) and estimating the angle of arrival (the direction of arrival) of the reflected waves by using a signal processing algorithm based on the reception phase difference with respect to the element interval (the antenna interval). Note that this technique is referred to as "Direction of Arrival (DOA) estimation". The second configuration enables a receiving branch to estimate the angle of arrival even when scan of the transmission beam is made at thinning-out scan intervals at a transmitting branch. As a result, the scanning time can be reduced, and the tracking performance is improved, as compared with the first configuration.

By using an array antenna having a configuration in which a plurality of antennas (antenna elements) are arranged at predetermined intervals in the horizontal direction and receiving a reflected wave from a target, the radar apparatus can achieve direction-of-arrival estimation in the azimuth angle direction. In addition, by using an array antenna having a configuration in which a plurality of antennas (antenna elements) are arranged at predetermined intervals in the vertical direction and receiving a wave reflected from the target, the radar apparatus can achieve direction-of-arrival estimation in the depression angle direction. Furthermore, by using an array antenna having a configuration in which a plurality of antennas (antenna elements) are arranged at predetermined intervals in the horizontal direction and the vertical direction and receiving a reflected wave from a target, the radar apparatus can achieve two-dimensional (azimuth and depression angle) direction-of-arrival estimation.

In addition, the following configuration of a radar apparatus has been proposed that includes a plurality of antennas (an array antenna) in the transmitting branch in addition to the receiving branch and performs beam scanning through signal processing using a transmission-reception array antenna (refer to, for example, J. Li, and P. Stoica, "MIMO Radar with Colocated Antennas," Signal Processing Magazine, IEEE Vol. 24, Issue: 5, pp. 106-114, 2007). Radar apparatuses having such a configuration are referred to as "MIMO radars".

SUMMARY

However, when the position (the height) of the target is lower than the installation position of the radar apparatus (hereinafter referred to as the "radar installation height"), the radar apparatus may receive a component of a radar transmission wave that is reflected by a road surface). As a result, the estimation accuracy of the position (the size) of the target and, in particular, the estimation accuracy of the target height may deteriorate.

One non-limiting and exemplary embodiment provides a radar apparatus, a position estimation apparatus, and a position estimation method capable of highly accurately estimating the position of a target.

In one general aspect, the techniques disclosed here feature a radar apparatus including a reception circuit that receives a reflected wave signal which is a radar signal reflected by a target by using a plurality of receiving antennas and an estimation processing circuit that estimates a position of the target by using the received reflected wave signal. The estimation processing circuit includes an extraction circuit, a detection circuit, and an estimation circuit. The extraction circuit extracts, by using the reflected wave signal of a linear array composed of receiving antennas linearly arranged in a first direction among the plurality of receiving antennas, an angle of arrival of the reflected wave signal in the first direction, the detection circuit detects an angle spread in the first direction around the angle of arrival by using the reflected wave signal of the linear array, and the estimation circuit estimates the position of the target in the first direction by using the angle of arrival and the angle spread.

According to an aspect of the present disclosure, the position of the target can be accurately estimated.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In an MIMO radar, by determining the optimum arrangement of the antenna elements in the transmitting-receiving array antenna, a virtual receiving array antenna can be provided that is equivalent to antenna elements equal in number to the product of the number of transmitting antenna elements and the number of receiving antenna elements at maximum. Hereinafter, the virtual receiving array antenna is simply referred to as a "virtual receiving array". In this manner, an effect of increasing the effective aperture length of an array antenna can be obtained by a small number of elements.

By performing the direction-of-arrival estimation process using the signal received by the above-described virtual receiving array, angle measurement with increased resolution can be conducted.

In addition to one-dimensional scanning in the vertical direction or the horizontal direction, the MIMO radar can be applied to beam scanning in a two-dimensional plane that extends in the vertical direction and in the horizontal direction.

Figure 1A:
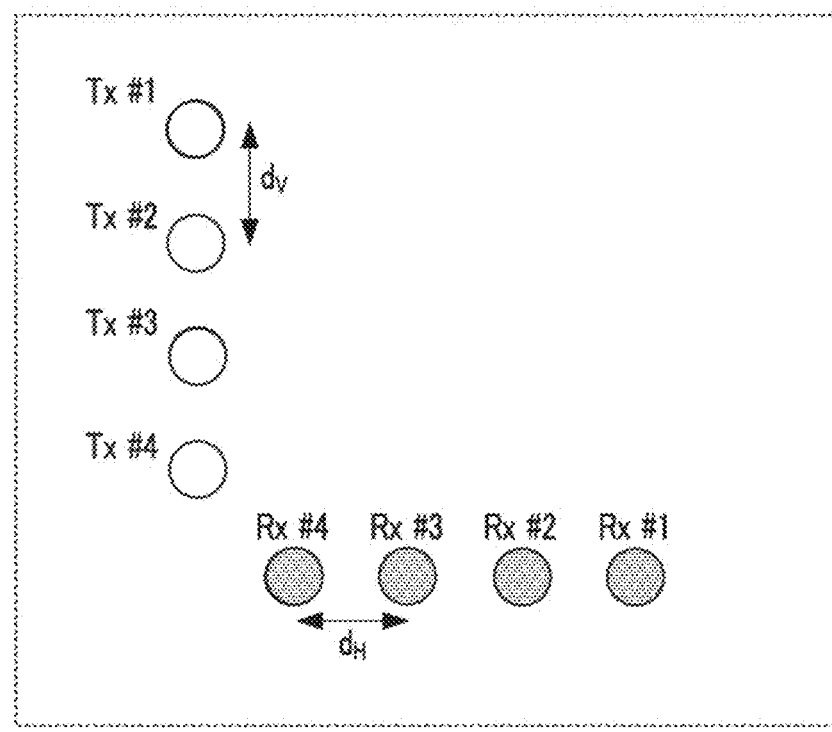
FIG. 1A illustrates an example of the arrangement of transmitting and receiving antennas.

For example, FIG. 1A illustrates a transmitting array antenna including four transmitting antennas (Tx #1 to Tx #4) arranged in the vertical direction and four receiving antennas (Rx #1 To Rx #4) arranged in the horizontal direction. In FIG. 1A, the transmitting antennas are arranged at equal intervals ($d_V$) in the vertical direction, and the receiving antennas are arranged at equal intervals ($d_H$) in the horizontal direction.

Figure 1B:
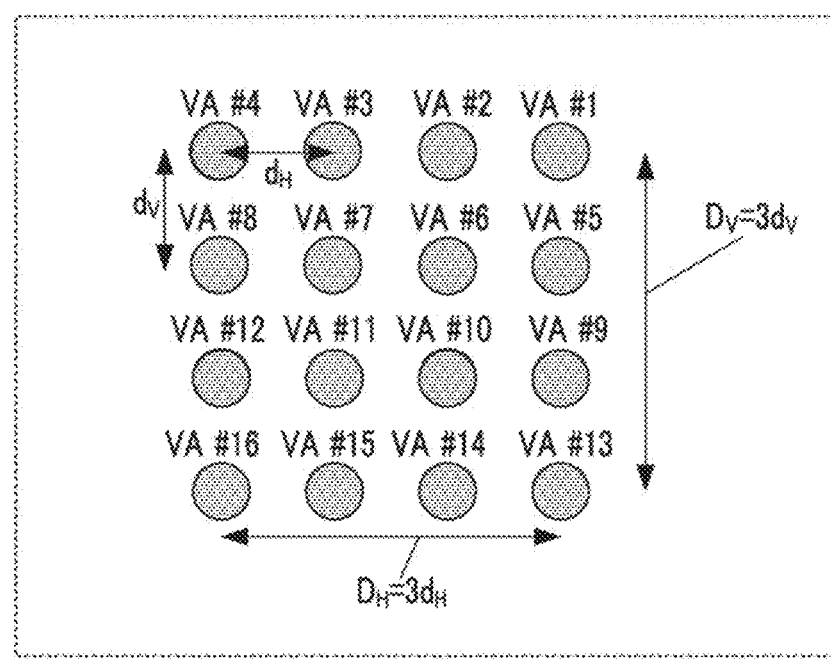
FIG. 1B illustrates an example of the arrangement in a virtual receiving array.

FIG. 1B illustrates a virtual receiving array including transmitting and receiving array antennas arranged as illustrated in FIG. 1A. The virtual receiving array illustrated in FIG. 1B is composed of a 16-element virtual receiving antenna (VA #1 to VA #16) in which four antennas are arranged in the horizontal direction and four antennas are arranged in the vertical direction to form a rectangular shape. In FIG. 1B, the element intervals in the horizontal direction and the vertical direction of the virtual receiving array are $d_H$ and $d_V$, respectively. That is, the aperture length $D_H$ in the horizontal direction and the aperture length $D_V$ in vertical direction of the virtual receiving array are $3d_H$ and $3d_V$, respectively.

As described above, by arranging the antennas while shifting the arrangement of the receiving antenna in the vertical direction, the radar apparatus can perform angle measurement in the vertical direction. In addition, in the case of a MIMO radar, by arranging the antennas while shifting the arrangement of either one of the transmitting antenna and the receiving antenna or both of them in the vertical direction, the radar apparatus can perform angle measurement in the vertical direction. In this manner, the radar apparatus can detect the three-dimensional position (the size) of the reflection point of the target by receiving the wave signal of the radar wave transmitted from the radar apparatus and reflected by the target and, thereafter, estimating the distance to the target and performing target angle measurement in the horizontal direction and the vertical direction.

However, if the position of the target is lower than the installation height of the radar, the radar apparatus may receive a component of the radar transmission wave reflected by the road surface (a road reflection wave). The road reflection wave affects the accuracy of estimating the height of the target (the target height), which is the position of the target in the vertical direction.

Figure 2:
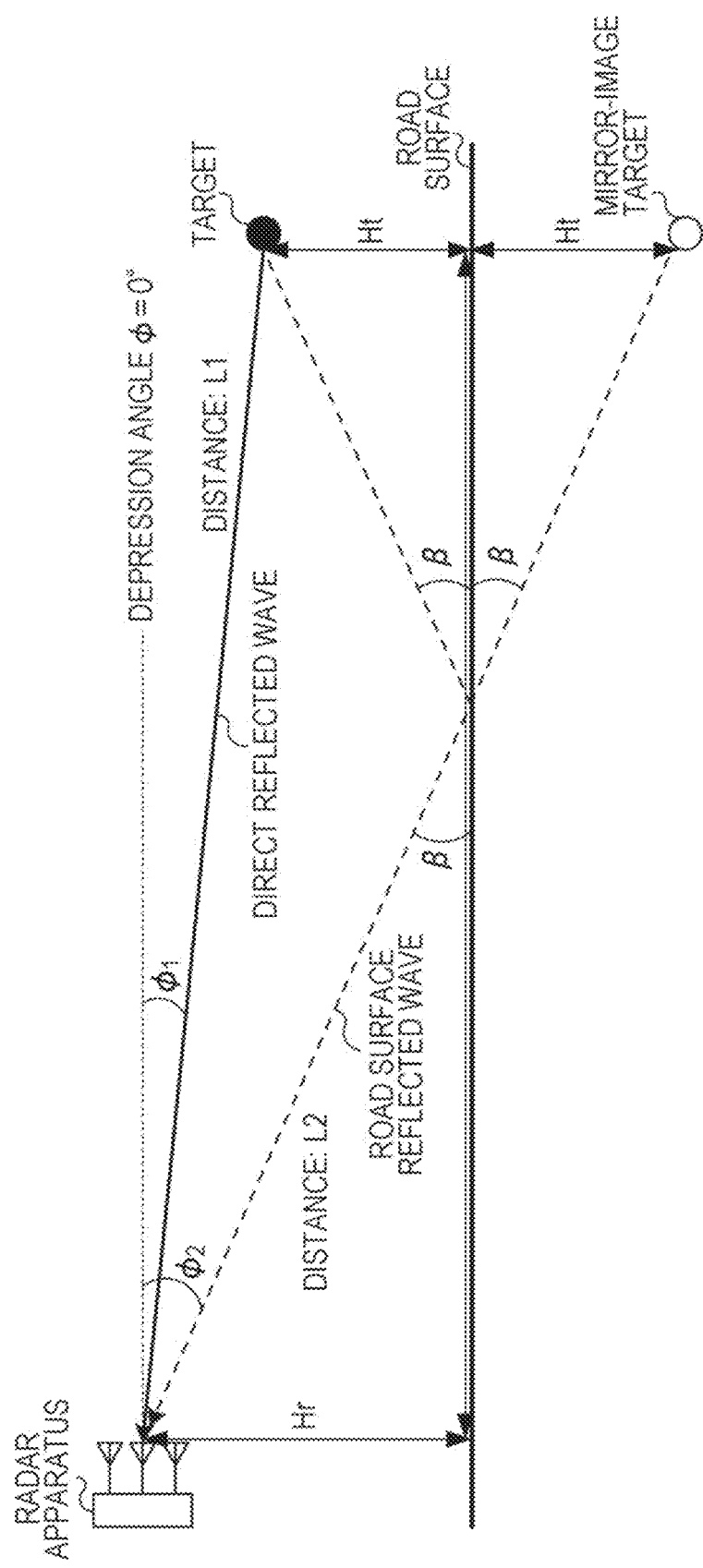
FIG. 2 illustrates an example of a direct reflected wave and a road reflected wave received by a radar apparatus.

For example, FIG. 2 illustrates a case where a target is located at a height (a target height Ht) lower than a radar installation height H. As illustrated in FIG. 2, the reflected wave signal received by the radar apparatus includes a "direct reflected wave" and a "road reflected wave". The direct reflected wave is the radar transmission wave directly reflected by the target in the radar direction. The "road reflected wave" is a wave reflected by the target and further reflected by the road surface and travelling in the radar direction.

The reception intensity of the road reflected wave in the radar apparatus varies depending on the condition for the road surface or an incident angle β to the road surface. In addition, the incident angle β varies depending on the distance (L1) from the radar apparatus to the target and the target height (Ht). Upon receiving the road reflected wave from the target, the radar apparatus assumes that the road surface is a mirror surface and the target is located at the position of the specular virtual image of the target (the mirror-image target). Thereafter, the radar apparatus estimates the target position (the position of the mirror-image target).

If, at this time, the reception intensity of the road reflected wave is not negligible with respect to the reception intensity of the direct reflected wave received by the radar apparatus from the target, the signal received by the radar apparatus is a signal obtained by combining the direct reflected wave with the road reflected wave. In this case, if the radar apparatus cannot receive the direct reflected wave and the road reflected wave separated by the distance component or the angular component, there arises a problem of the height of the target not being accurately measured.

Figure 3:
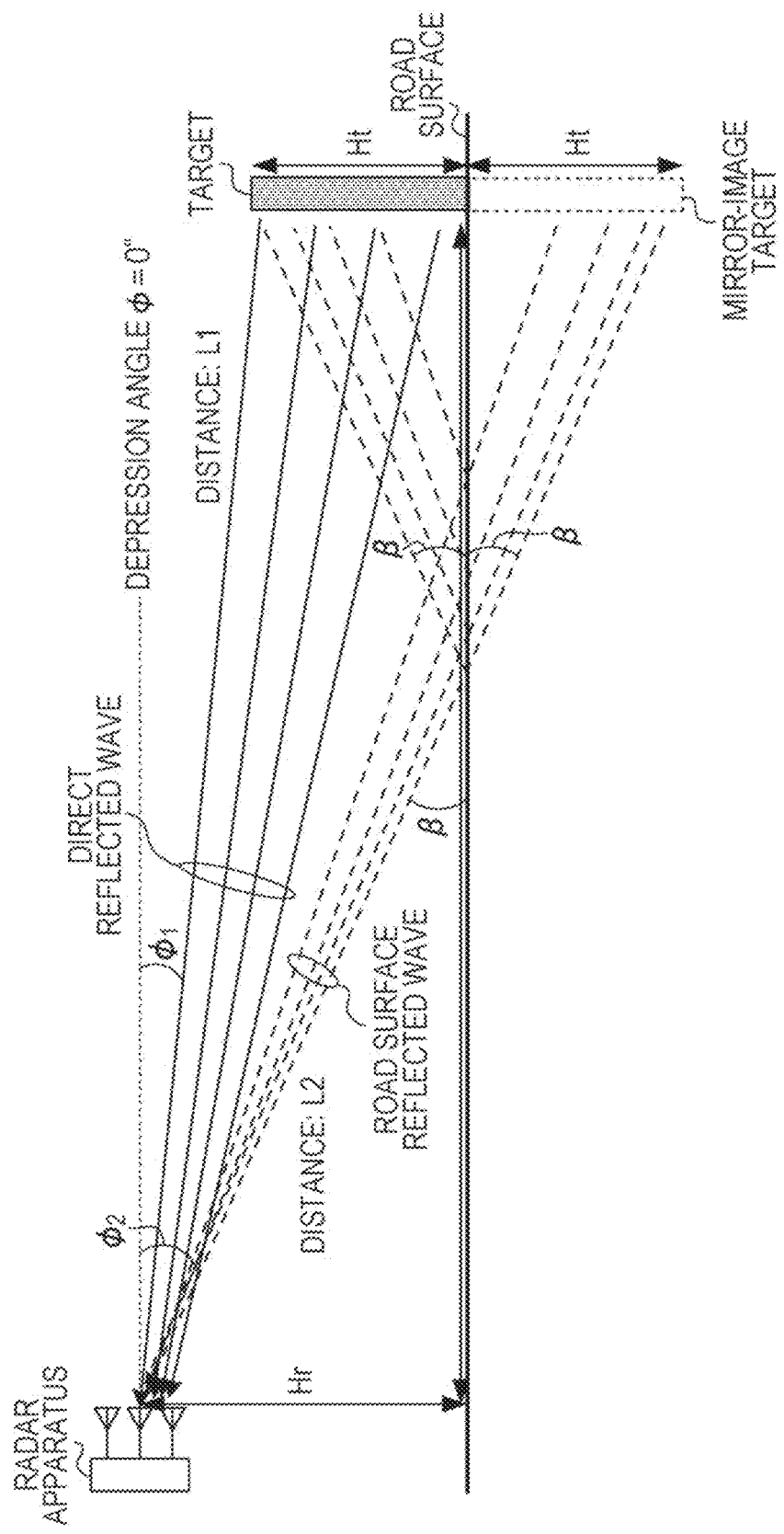
FIG. 3 illustrates an example of a direct reflected wave and a road reflected wave received by a radar apparatus.

In addition, even when the radar apparatus has a sufficiently high distance resolution or angular resolution and receives the direct reflected wave and the road reflected wave separated from each other, the following problem arises. That is, if a flat target having the target height Ht extends in the height direction below the radar installation height $H_r$, direct reflected waves of the radar transmission wave that are directly reflected by the target in the radar direction are planarly generated as illustrated in FIG. 3. Thus, these direct reflected waves are combined and received by the radar apparatus. Furthermore, as illustrated in FIG. 3, waves reflected by the target are planarly radiated in the direction toward the road surface and, thus, the road reflected waves that are reflected by the road surface and are planarly radiated in the radar direction are produced. The road reflected waves are combined and received by the radar apparatus.

As described above, the reception intensity of the road reflected wave in the radar apparatus varies depending on the condition for the road surface or the incident angle $\beta$ to the road surface (related to the distance to the target or the height of the target). In the case where the reception intensity of the road reflection wave is not negligible with respect to the reception intensity of the direct reflected wave reflected by the target and received by the radar apparatus, the signal received by the radar apparatus is one produced by combining the direct reflected waves with the road reflected wave that planarly occur. In this case, even when the radar apparatus has a sufficiently high distance resolution or angular resolution, it is difficult to separately receive the direct reflected wave and the road reflected wave by the distance component or the angular component. Thus, there arises a problem of the height of the target not being accurately measured.

If the radar apparatus receives the direct reflected wave and the road reflected wave of substantially the same reception strength, there arises a problem of the radar apparatus estimating the target height as a height smaller than the actual target height. For example, in the case where the radar apparatus is mounted in, for example, a vehicle and collision determination is carried out, if the above-described problem occurs, the radar apparatus cannot correctly estimate the height of a target, such as a curb or a block having a low target height. Thus, there arises a problem of incorrect collision determination.

To solve the above problem, a technique has been proposed to improve the accuracy of estimating the height of a target on the basis of a change in the height detection result with a change in distance or time as the vehicle having the radar apparatus mounted therein moves (refer to, for example, Japanese Unexamined Patent Application Publication No. 2013-53946). However, according to the technique described in Japanese Unexamined Patent Application Publication No. 2013-53946, if the vehicle is stopped or if the target is located on the side of the vehicle, it is difficult to detect the target height.

According to an aspect of the present disclosure, a method for accurately estimating the target height is described even when the position of the target is lower than the radar installation height, even when the vehicle is stopped, or even when the target is located on the side of the vehicle.

An embodiment according to an aspect of the present disclosure is described in detail below with reference to the accompanying drawings. The same reference numerals are used throughout the embodiment to designate the same constituent elements, and the description of the constituent elements is not repeated.

The configuration of a radar apparatus is described below. In the configuration, different code-division multiplexed transmission signals are transmitted from a plurality of transmitting antennas in a transmitting branch, and the transmission signals are separated to perform a reception process in the receiving branch. However, the configuration of the radar apparatus is not limited thereto. Different frequency-division multiplexed transmission signals may be transmitted from a plurality of transmitting antennas in a transmitting branch, and the transmission signals may be separated to perform a reception process in the receiving branch. Alternatively, the configuration of the radar apparatus may be such that time-division multiplexed transmission signals are transmitted from a plurality of transmitting antennas in a transmitting branch, and a reception process is performed in a receiving branch.

Configuration of Radar Apparatus

Figure 4:
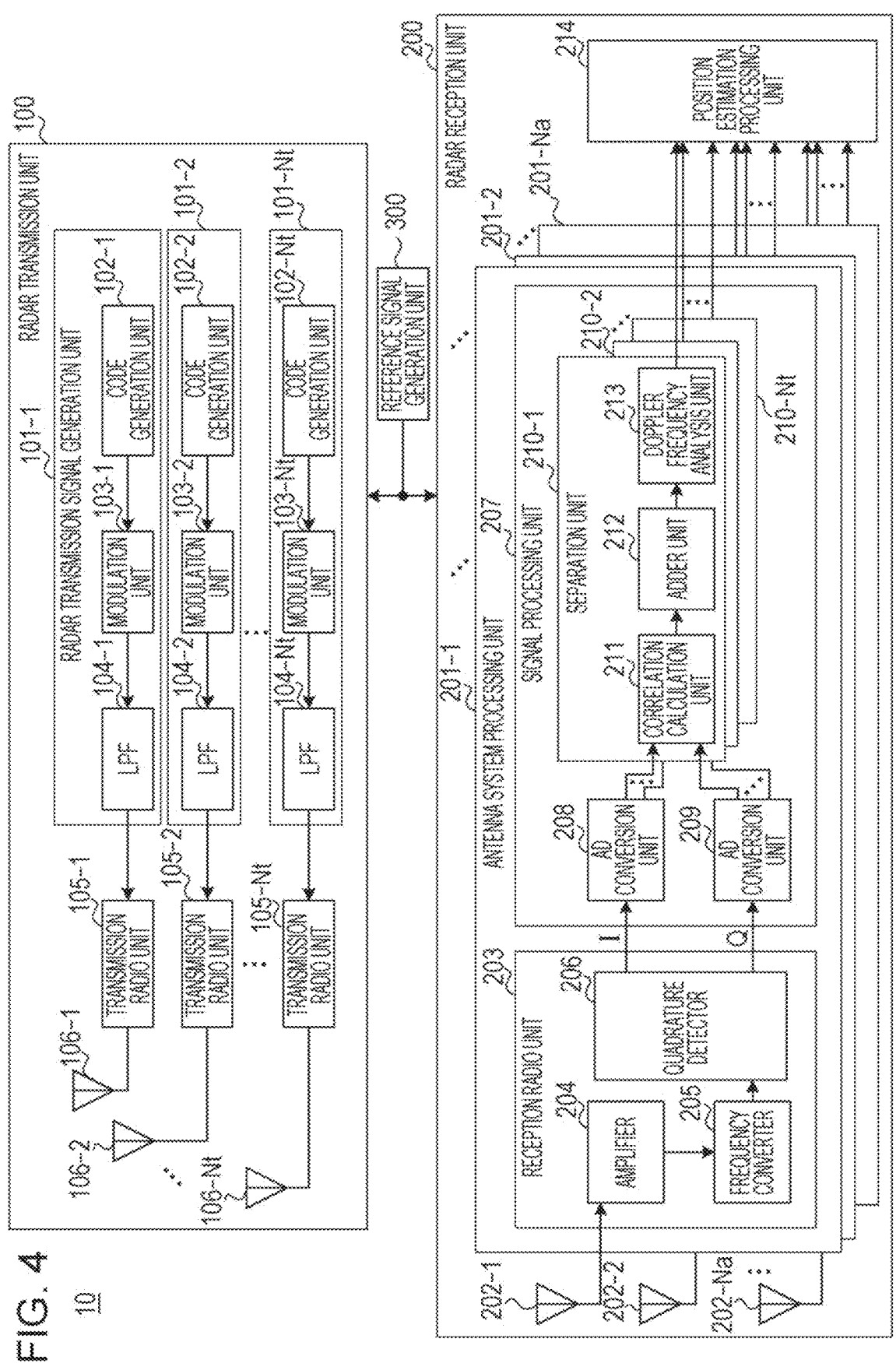
FIG. 4 is a block diagram illustrating the configuration of a radar apparatus according to an embodiment.

FIG. 4 is a block diagram illustrating the configuration of a radar apparatus 10 according to the present embodiment.

The radar apparatus 10 includes a radar transmission unit (a transmitting branch) 100, a radar reception unit (a receiving branch) 200, and a reference signal generation unit 300.

The radar transmission unit 100 generates a high-frequency (high-radio frequency) radar signal (a radar transmission signal) on the basis of a reference signal received from the reference signal generation unit 300. Thereafter, the radar transmission unit 100 transmits a radar transmission signal at predetermined transmission intervals by using a transmitting array antenna composed of a plurality of transmitting antennas 106-1 to 106-Nt.

The radar reception unit 200 receives a reflected wave signal, which is a radar transmission signal reflected by a target (not illustrated), by using a receiving array antenna composed of a plurality of receiving antennas 202-1 to 202-Na. The radar reception unit 200 performs a process in synchronization with the radar transmission unit 100 by performing the processing operation described below by using the reference signal received from the reference signal generation unit 300. That is, the radar reception unit 200 performs signal processing on the reflected wave signal received by each of the receiving antennas 202 and performs at least detection of the presence of a target and estimation of the direction. Note that the target is an object to be detected by the radar apparatus 10. Examples of a target include a vehicle (including a four-wheel vehicle and a two-wheel vehicle), a person, a block, and a curb.

The reference signal generation unit 300 is connected to each of the radar transmission unit 100 and the radar reception unit 200. The reference signal generation unit 300 supplies a reference signal serving as a reference to the radar transmission unit 100 and the radar reception unit 200 so as to synchronize the processes performed by the radar transmission unit 100 and the radar reception unit 200 with each other.

Configuration of Radar Transmission Unit

The radar transmission unit 100 includes radar transmission signal generation units 101-1 to 101-Nt, transmission radio units 105-1 to 105-Nt, and transmitting antennas 106-1 to 106-Nt. That is, the radar transmission unit 100 includes Nt transmitting antennas 106, and each of the transmitting antennas 106 is connected to a corresponding one of the radar transmission signal generation units 101 and a corresponding one of the transmission radio units 105.

The radar transmission signal generation unit 101 generates a timing clock by multiplying the reference signal received from the reference signal generation unit 300 by a predetermined number. Thereafter, the radar transmission signal generation unit 101 generates a radar transmission signal on the basis of the generated timing clock. Subsequently, the radar transmission signal generation unit 101 repeatedly outputs a radar transmission signal per predetermined radar transmission period (Tr). The radar transmission signal is expressed by $r_z(k, M) = I_z(k, M) + jQ_z(k, M)$, where z represents the number corresponding to each of the transmitting antennas 106, and z=1, . . . , Nt. In addition, j represents the imaginary unit, k represents discrete time, and M represents the ordinal number of a radar transmission period.

Each of the radar transmission signal generation units 101 includes a code generation unit 102, a modulation unit 103, and a low pass filter (LPF) 104. Each of the constituent units of the radar transmission signal generation unit 101-z corresponding to the zth transmitting antenna 106 (z=1, . . . , Nt) is described below.

More specifically, the code generation unit 102 generates code $a(z)_n$ (n=1, . . . , L) (pulse code) of the code sequence having a code length of L during each of radar transmission periods Tr. As the codes $a(z)_n$ (z=1, . . . , Nt) generated by the code generation units 102-1 to 102-Nt, respectively, codes having a low correlation or no correlation with one another are used. Examples of a code sequence include the Walsh-Hadamard code, the M sequence code, and the Gold code.

The modulation unit 103 performs pulse modulation (one of amplitude modulation, Amplitude Shift Keying (ASK), and pulse shift keying) or phase modulation (Phase Shift Keying) on the code $a(z)_n$ received from the code generation unit 102. Thereafter, the modulation unit 103 outputs the modulated signal to the LPF 104.

The LPF 104 selects, from the modulated signal received from the modulation unit 103, a signal component that is lower than or equal to a predetermined limited band and outputs the signal component to the transmission radio unit 105 as a baseband radar transmission signal.

The zth (z=1, . . . , Nt) transmission radio unit 105 performs frequency conversion on the baseband radar transmission signal output from the zth radar transmission signal generation unit 101 to generate a radar transmission signal in the carrier frequency (radio Frequency (RF)) band. Thereafter, the zth transmission radio unit 105 amplifies the radar transmission signal to a predetermined transmission power level P [dB] by a transmission amplifier and outputs the radar transmission signal to the zth transmitting antenna 106.

The zth (z=1, . . . , Nt) transmitting antenna 106 radiates the radar transmission signal output from the zth transmission radio unit 105 into space.

Figure 5:
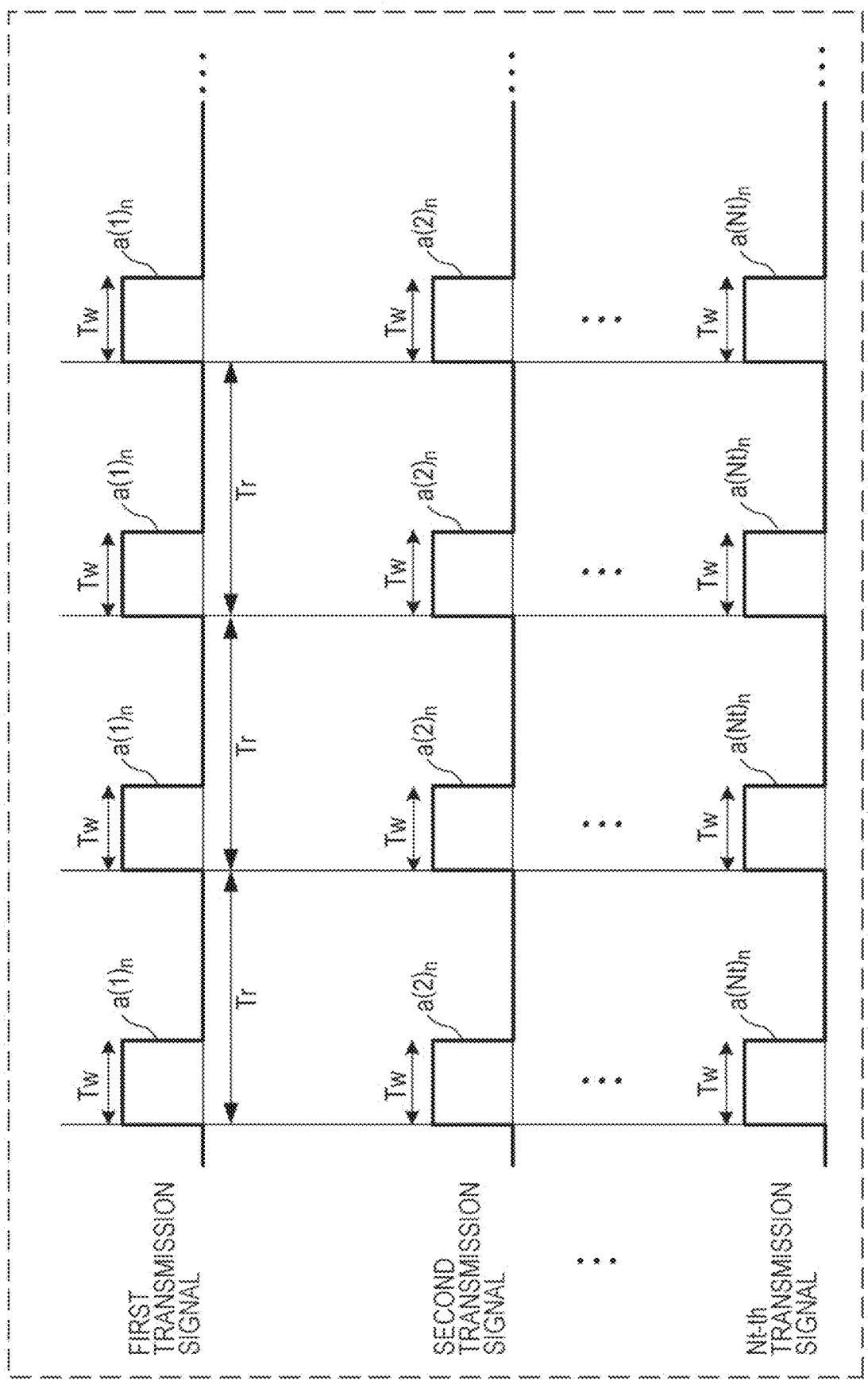
FIG. 5 illustrates an example of radar transmission signals according to an embodiment.

FIG. 5 illustrates the radar transmission signals transmitted from the Nt transmitting antennas 106 of the radar transmission unit 100. A code transmission period Tw includes a pulse code sequence having a code length of L. During each of radar transmission periods Tr, the pulse code sequence is transmitted in the code transmission period Tw, and the remaining period (Tr–Tw) is a no signal period. Pulse modulation using No samples is performed per pulse code ($a(z)_n$), so that Nr (=No×L) sample signals are included in each of the code transmission periods Tw. That is, the sampling rate in the modulation unit 103 is (No×L)/Tw. In addition, Nu samples are included in the no-signal period (Tr–Tw).

Figure 6:
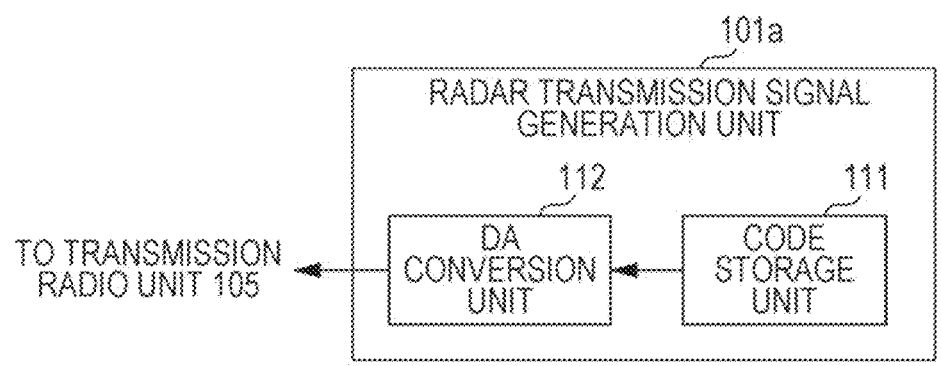
FIG. 6 is a block diagram illustrating another configuration of a radar transmission signal generation unit according to an embodiment.

Note that the radar transmission unit 100 may include a radar transmission signal generation unit 101a illustrated in FIG. 6 instead of the radar transmission signal generation unit 101. The radar transmission signal generation unit 101a does not include the code generation unit 102, the modulation unit 103, and the LPF 104 illustrated in FIG. 4. Instead, the radar transmission signal generation unit 101a includes a code storage unit 111 and a DA conversion unit 112. The code storage unit 111 prestores a code sequence generated by the code generation unit 102 (FIG. 4) and sequentially reads the stored code sequence cyclically. The DA conversion unit 112 converts the code sequence (a digital signal) output from the code storage unit 111 into an analog signal.

Configuration of Radar Reception Unit

In FIG. 4, the radar reception unit 200 includes Na receiving antennas 202 and functions as an array antenna. In addition, the radar reception unit 200 includes Na antenna system processing units 201-1 to 201-Na and a position estimation processing unit 214 (a position estimation apparatus).

Each of the receiving antennas 202 receives a reflected wave signal which is a radar transmission signal reflected by a target and outputs, to the corresponding antenna system processing unit 201, the received reflected wave signal as a reception signal.

Each of the antenna system processing units 201 includes a reception radio unit 203 and a signal processing unit 207.

The reception radio unit 203 includes an amplifier 204, a frequency converter 205, and a quadrature detector 206. The reception radio unit 203 generates a timing clock by multiplying the reference signal received from the reference signal generation unit 300 by a predetermined number and operates on the basis of the generated timing clock. More specifically, the amplifier 204 amplifies the reception signal received from the receiving antenna 202 to a predetermined level. The frequency converter 205 frequency-converts the high-frequency band reception signal into a baseband band signal, and the quadrature detector 206 converts the baseband reception signal into a baseband reception signal including the I signal and the Q signal through quadrature detection.

The signal processing unit 207 includes AD conversion units 208 and 209 and separation units 210-1 to 210-Nt.

The I signal is input from the quadrature detector 206 to the AD conversion unit 208, and the Q signal is input from the quadrature detector 206 to the AD conversion unit 209. The AD conversion unit 208 performs sampling on the baseband signal including the I signal at discrete times to convert the I signal into digital data. The AD conversion unit 209 performs sampling on the baseband signal including the Q signal at discrete times to convert the Q signal into digital data.

At this time, in the sampling operation performed by the AD conversion units 208 and 209, Ns discrete sampling operations are performed per sub-pulse time Tp (=Tw/L) of the radar transmission signal. That is, the number of oversamples per sub-pulse is Ns.

In the following description, the baseband reception signal output from the AD conversion units 208 and 209 at a discrete time k in the Mth radar transmission period Tr[M] is expressed as a complex signal $x(k, M) = Ir(k, M) + j\ Qr(k, M)$ by using the I signal Ir(k, M) and the Q signal Qr(k, M). In addition, hereinafter, the discrete time k is defined based on the time point at which the radar transmission period (Tr) starts (k=1). The signal processing unit 207 cyclically operates until k=(Nr+Nu)Ns/No which represents a sample point immediately before the end of the radar transmission period Tr. That is, k=1, . . . , (Nr+Nu)Ns/No. Note that j is the imaginary unit.

The signal processing unit 207 includes Nt separation units 210 equal in number to the number of the branches for the transmitting antennas 106. Each of the separation units 210 includes a correlation calculation unit 211, an adder unit 212, and a Doppler frequency analysis unit 213. The configuration of the zth (z=1, . . . , Nt) separation unit 210 is described below.

In each of the radar transmission periods Tr, the correlation calculation unit 211 calculates a correlation between the discrete sample value x(k, M) including the discrete sample values Ir(k, M) and Qr(k, M) received from the AD conversion units 208 and 209, respectively, and the pulse code $a(z)_n$ (z=1, . . . , Nt, and n=1, . . . , L) having a code length of L and transmitted by the radar transmission unit 100. For example, the correlation calculation unit 211 performs sliding correlation calculation between the discrete sample values x(k, M) and the pulse code $a(z)_n$. For example, a correlation calculation value $AC_{(z)}$(k, M) of the sliding correlation calculation at the discrete time k in the Mth radar transmission period Tr[M] is calculated as follows:

$$AC_{(z)}(k, M) = \sum_{n=1}^{L} x(k + N_s(n-1), M)a(z)_n^*, \quad (1)$$

where the asterisk (*) represents a complex conjugate operator.

The correlation calculation unit 211 performs correlation calculation over, for example, periods of k=1, . . . , (Nr+Nu)Ns/No according to Equation (1).

Figure 7:
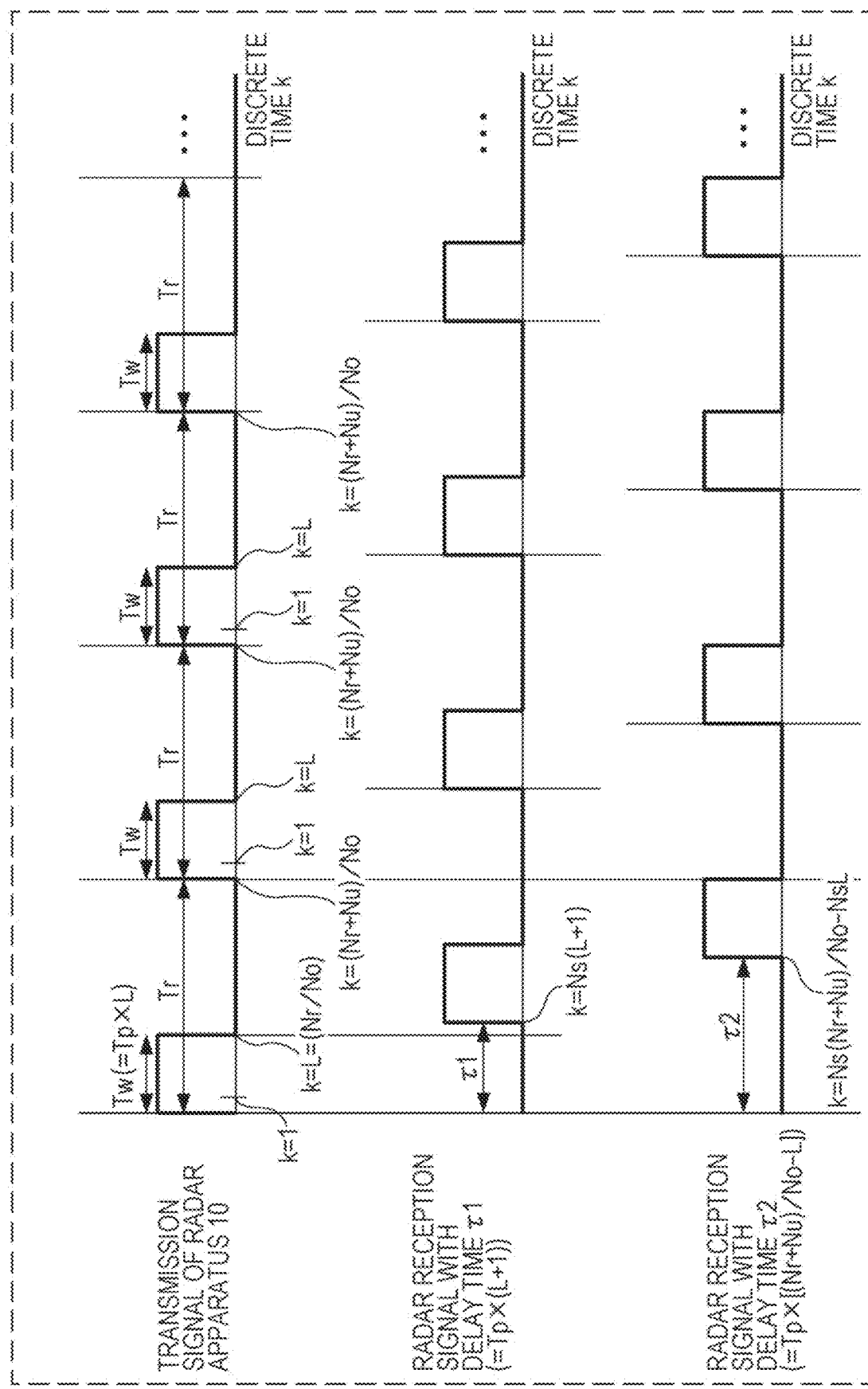
FIG. 7 illustrates an example of the transmission time points and the measurement range of a radar transmission signal according to an embodiment.

Note that the correlation calculation unit 211 may set a measurement range (that is, the range of k) in accordance with the area within which the target to be measured by the radar apparatus 10 is located, without limiting the measurement range to the range defined by k=1, . . . , (Nr+Nu)Ns/No. In this manner, the radar apparatus 10 can reduce the amount of calculation required by the correlation calculation unit 211. For example, the correlation calculation unit 211 may limit the measurement range to a range defined by k=Ns(L+1), . . . , (Nr+Nu)Ns/No−NsL. In this case, as illustrated in FIG. 7, the radar apparatus 10 does not perform the measurement in the time period corresponding to the code transmission period Tw.

Thus, even when the radar transmission signal directly reaches the radar reception unit 200, the correlation calculation unit 211 does not perform the process thereof in a period during which the radar transmission signal reaches the radar reception unit 200 (at least a period of τ1 or shorter). As a result, the radar apparatus 10 can perform measurements without the influence of direct reach of the radar transmission signal. In addition, when the measurement range (the range defined by k) is limited, the processing in which the measurement range (the range defined by k) is limited can be applied to the processing performed by the adder unit 212, the Doppler frequency analysis unit 213, and the position estimation processing unit 214 (described below) in a similar manner. As a result, the amount of processing performed by each of the constituent elements can be reduced, and power consumption of the radar reception unit 200 can be reduced.

The adder unit 212 sums (coherent integrates) the correlation calculation value $AC_{(z)}$(k, M) over a predetermined number (Np) of radar transmission periods Tr (Tr×Np) by using the correlation calculation value $AC_{(z)}$(k, M) received from the correlation calculation unit 211 at every discrete time k in the Mth radar transmission period Tr. The summing (coherent integration) process performed the addition number Np of times over the period (Tr×Np) is expressed as follows:

$$CI_{(z)}(k, m) = \sum_{g=1}^{N_P} AC_{(z)}(k, N_P(m-1) + g), \quad (2)$$

where $CI_{(z)}$(k, m) represents the cumulative total value of the correlation calculation values (hereinafter referred to as a "cumulative correlation value"), Np is an integer greater than or equal to 1, and m is the ordinal number of addition (m is an integer greater than or equal to 1) when the number of additions Np performed by the adder unit 212 is considered as one unit of additions. In addition, z=1, . . . , Nt.

The adder unit 212 considers the outputs of the correlation calculation unit 211 in each of the radar transmission periods Tr as one unit and performs addition Np times. That is, the adder unit 212 considers the correlation calculation values $AC_{(z)}$(k, Np(m−1)+1) to $AC_{(z)}$(k, Np×m) as one unit and calculates the correlation value $CI_{(z)}$(k, m), which is the sum, at each of constant discrete times k. In this manner, the adder unit 212 can improve the SNR of the reflected wave signal in a range where the reflected wave signals from the target have a high correlation due to the effect of Np additions of the correlation calculated values. As a result, the radar reception unit 200 can improve the measurement performance regarding the estimation of the arrival distance of the target.

In order to obtain an ideal summed gain, it is necessary to introduce a condition in which the phase components of the correlation calculation values are almost uniform during the period in which Np additions of the correlation calculation value are performed. That is, it is desirable that the number of additions Np be set on the basis of the possible highest moving speed of the target to be measured. This is because the amount of change in the Doppler frequency contained in the reflected wave from the target increases with increasing possible highest moving speed of the target. Thus, the time period having a high correlation decreases. Accordingly, the number of additions Np decreases, and the effect of increasing the gain due to the addition performed by the adder unit 212 is reduced.

The Doppler frequency analysis unit 213 considers the outputs $CI_{(z)}$(k, Nc(w−1)+1) to $CI_{(z)}$(k, Nc×w), which are Nc outputs of the adder unit 212 output at each of the constant discrete times k and performs coherent integration at the constant discrete times k. For example, the Doppler frequency analysis unit 213 corrects the phase fluctuation $\phi(fs)=2\pi fs(Tr \times Np)\Delta\phi$ in accordance with 2Nf different Doppler frequencies $fs\Delta\phi$ and, thereafter, performs coherent integration as follows:

$$FT\_CI_{(z)}^{Nant}(k, f_s, w) = \sum_{q=0}^{N_c-1} CI_{(z)}(k, N_c(w-1) + q + 1)\exp[-j\phi(f_s)q] \quad (3)$$

$$= \sum_{q=0}^{N_c-1} CI_{(z)}(k, N_c(w-1) + q + 1)$$

$$\exp[-j2\pi f_s T_r N_p q \Delta\phi],$$

where $FT\_CI_{(z)}^{Nant}$(k, fs, w) is the wth output of the Doppler frequency analysis unit 213, which indicates the result of coherent integration of the Doppler frequency $fs\Delta\phi$ at the discrete time k in the $N_{ant}$th antenna system processing unit

201. Note that $N_{ant}=1$ to Na, fs=−Nf+1, ..., 0, ..., Nf, k=1, ..., (Nr+Nu)Ns/No, w is an integer greater than or equal to 1, and Δϕ is a unit of phase rotation.

As a result, each of the antenna system processing units 201 obtains $FT\_CI_{(z)}^{Nant}(k, -Nf+1, w)$, ..., and $FT\_CI_{(z)}^{Nant}(k, Nf-1, w)$, which are the results of coherent integration in accordance with 2Nf Doppler frequency components at the discrete times k, for every period that is a plurality of numbers (Np×Nc) of the radar transmission periods Tr (Tr×Np×Nc). Note that j is an imaginary unit, and z=1, ..., Nt.

In the case of Δϕ=1/Nc, the processing performed by the Doppler frequency analysis unit 213 is equivalent to the processing of performing discrete Fourier transform (DFT) on the output of the adder unit 212 at a sampling interval of Tm=(Tr×Np) and a sampling frequency of fm=1/Tm.

In addition, by setting Nf to the power of 2, the Doppler frequency analysis unit 213 can apply Fast Fourier Transform (FFT) processing and, thus, reduce the amount of required calculation. Note that when Nf>Nc, the FFT processing can be similarly applied by performing zero filling processing such that $CI_{(z)}(k, Nc(w-1)+q)=0$ in the region where q>Nc. Thus, the amount of computation can be reduced.

In addition, the Doppler frequency analysis unit 213 may sequentially perform a product-sum operation expressed by the above-described equation (3) instead of performing the FFT processing. That is, the Doppler frequency analysis unit 213 may generate the coefficient $\exp[-j2\pi f_s T_r N_q q \Delta\phi]$ corresponding to fs=−Nf+1, ..., 0, ..., Nf−1 for $CI_{(z)}(k, Nc(w-1)+q+1)$, which is each of Nc outputs of the adder unit 212 obtained at discrete times k and sequentially perform a product-sum operation. Note that q=0 to Nc−1.

In the following description, the wth outputs $FT\_CI_{(z)}^1(k, fs, w)$, $FT\_CI_{(z)}^2(k, fs, w)$, ..., and $FT\_CI_{(z)}^{Na}(k, fs, w)$ obtained by performing the same processing in each of the Na antenna system processing units 201 are expressed in the form of the virtual receiving array correlation vector h(k, fs, w) as follows:

$$h(k, fs, w) = \begin{bmatrix} FT\_CI_{(1)}^1(k, fs, w) \\ FT\_CI_{(2)}^1(k, fs, w) \\ \vdots \\ FT\_CI_{(Nt)}^1(k, fs, w) \\ FT\_CI_{(1)}^2(k, fs, w) \\ FT\_CI_{(2)}^2(k, fs, w) \\ \vdots \\ FT\_CI_{(Nt)}^2(k, fs, w) \\ \vdots \\ FT\_CI_{(1)}^{Na}(k, fs, w) \\ FT\_CI_{(2)}^{Na}(k, fs, w) \\ \vdots \\ FT\_CI_{(Nt)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix}, \quad (4)$$

and $$h^b(k, fs, w) = \begin{bmatrix} FT\_CI_{(1)}^b(k, fs, w) \\ FT\_CI_{(2)}^b(k, fs, w) \\ \vdots \\ FT\_CI_{(Nt)}^b(k, fs, w) \end{bmatrix}. \quad (5)$$

The virtual receiving array correlation vector h(k, fs, w) includes (Nt×Na) elements equal in number to the product of the number Nt of transmitting antennas and the number Na of receiving antennas. The virtual receiving array correlation vector h(k, fs, w) is used below to describe the process of performing direction estimation and target height estimation on the reflected wave signal from the target on the basis of the phase difference between the receiving antennas 202. Note that z=1, ..., Nt, and b=1, ..., Na.

The processing performed in each of the constituent elements of the signal processing unit 207 has been described above.

The position estimation processing unit 214 multiplies the virtual receiving array correlation vector h(k, fs, w) of the wth Doppler frequency analysis unit 213 output from the antenna system processing units 201-1 to 201-Na by the array correction value $h\_cal_{[y]}$ for correcting the phase deviation and the amplitude deviation between the transmitting array antennas and between the receiving array antennas. Thus, the position estimation processing unit 214 calculates the virtual receiving array correlation vector $h_{after\_cal}(k, fs, w)$ having corrected phase deviation and amplitude deviation between the antenna system processing units 201. The virtual receiving array correlation vector $h_{after\_cal}(k, fs, w)$ is expressed as follows:

$$h_{after\_cal}(k, fs, w) = C_a h(k, fs, w) = \begin{bmatrix} h_1(k, fs, w) \\ h_2(k, fs, w) \\ \vdots \\ h_{Nt \times Na}(k, fs, w) \end{bmatrix} \quad (6)$$

$$C_a = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}.$$

Note that y=1, ..., (Nt×Na). In addition, k=1, ..., (Nr+Nu)Ns/No, fs=−Nf+1, ..., 0, ..., Nf, and w is a natural number.

The virtual receiving array correlation vector $h_{after\_cal}(k, fs, w)$ obtained after the inter-antenna deviation is corrected is a column vector consisting of Na×Nt elements. In the description below, the elements of the virtual receiving array correlation vector $h_{after\_cal}(k, fs, w)$ are denoted as $h_1(k, fs, w)$, ..., and $h_{Nt \times Na}(k, fs, w)$ and are used below to describe the height estimation process.

The position estimation processing unit 214 performs the direction-of-arrival estimation process in the horizontal direction and the vertical direction and the height estimation process on the basis of the phase difference between the reflected waves incident on the receiving antennas. That is, the position estimation processing unit 214 estimates the position of the target (the angle of arrival and the target height) by using the reflected wave signal from the target.

Method for Estimating Target Height for Use in Radar Apparatus

The method for estimating the target height for use in the radar apparatus 10 having the above configuration is described in detail below.

Figure 8:
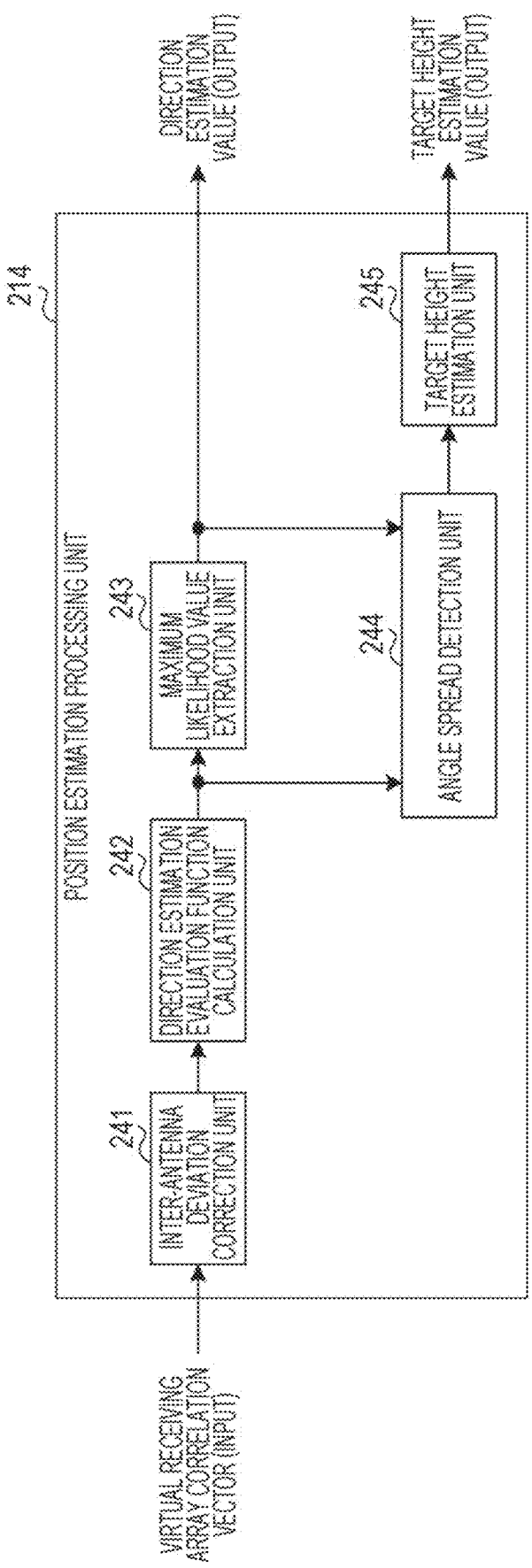
FIG. 8 is a block diagram illustrating an example of the internal configuration of a position estimation processing unit according to an embodiment.

FIG. 8 is a block diagram illustrating an example of the internal configuration of the position estimation processing unit 214 (the position estimation apparatus) in the radar apparatus 10 illustrated in FIG. 4.

As illustrated in FIG. 8, the position estimation processing unit 214 includes an inter-antenna deviation correction unit 241, a direction estimation evaluation function calculation unit 242, a maximum likelihood value extraction unit 243, an angle spread detection unit 244, and a target height estimation unit 245.

In the following description of the position estimation processing unit 214, the index values k, fs, and w of the virtual array correlation vector h(k, fs, w) are omitted. However, the position estimation processing unit 214 outputs a direction estimation value and a height estimation value together with the index values k, fs, and w. In addition, the position estimation processing unit 214 may output the direction estimation value and the target height estimation value for each of the index values k, fs, and w. Alternatively, the position estimation processing unit 214 may selectively limit values satisfying a predetermined condition, such as power value, and output the direction estimation value and the target height estimation value.

Operation Performed by Inter-Antenna Deviation Correction Unit

As described above, the inter-antenna deviation correction unit 241 corrects the phase deviation and the amplitude deviation between the antenna system processing units 201 by multiplying the virtual receiving array correlation vector h(k, fs, w) of the Doppler frequency analysis unit 213 output from each of the antenna system processing units 201-1 to 201-Na by the array correction value h_cal$_{[y]}$ (refer to, for example, Equation (6)).

Operation Performed by Direction Estimation Evaluation Function Calculation Unit The direction estimation evaluation function calculation unit 242 calculates a direction estimation evaluation function of estimating the direction-of-arrival in the vertical direction (hereinafter simply referred to as an "evaluation function") at predetermined angular intervals within a predetermined angle range by using the virtual receiving array correlation vector h$_{after\_cal}$(k, fs, w) having corrected inter-antenna deviation and input from the inter-antenna deviation correction unit 241. Note that instead of estimating only the vertical direction-of-arrival, the direction estimation evaluation function calculation unit 242 may calculate the evaluation function to estimate the horizontal direction-of-arrival and vertical direction-of-arrival.

As an example of the evaluation function, application of an evaluation function based on the principle of maximum likelihood estimation is described below. The direction estimation using the maximum likelihood estimation technique is described in, for example, I. Ziskind and M. Wax, "Maximum Likelihood Localization of Multiple Sources by Alternating Projection," IEEE Trans. On Acoustics, Speech, and Signal Processing, Vol. 36, No. 10, October 1988.

More specifically, the direction estimation evaluation function calculation unit 242 extracts, from the elements included in the virtual receiving array correlation vector h$_{after\_cal}$(k, fs, w) having corrected inter-antenna deviation (each of the elements corresponds to one of the virtual receiving antennas VA #1, . . . , and VA #(Nt×Na)), a vertical direction array correlation vector h$_{SubV}$(k, fs, w) composed of the elements of a virtual vertical direction linear array that form, in the vertical direction, a linear array of three or more antennas in the virtual receiving array.

Subsequently, the direction estimation evaluation function calculation unit 242 performs maximum likelihood estimation process for the vertical direction by using the vertical direction array correlation vector h$_{SubV}$(k, fs, w) composed of extracted elements of the virtual vertical direction linear array. In the maximum likelihood estimation in the vertical direction, the direction estimation evaluation function calculation unit 242 calculates angles $\phi^{(1)}$, $\phi^{(2)}$, . . . , and $\phi^{(NW)}$ in the vertical direction (hereinafter also referred to as "depression angles") that make the evaluation function E$_V(\phi^{(1)}, \phi^{(2)}, \ldots, \phi^{(NW)})$ based on the principle of maximum likelihood estimation minimum or maximum. Herein, NW (an integer greater than or equal to 1) represents the number of incoming waves. The minimum or maximum value of the evaluation function E$_V(\phi^{(1)}, \phi^{(2)}, \ldots, \phi^{(NW)})$ (described in more detail below) is the "maximum likelihood value of the evaluation function". In addition, NW angles $\phi^{(1)}$, $\phi^{(2)}$, . . . , and $\phi^{(NW)}$ in the vertical direction corresponding to the maximum likelihood value of the evaluation function are referred to as "maximum likelihood angles".

Note that the number NW of incoming waves may be a predetermined fixed number of waves or a number adaptively varied by using the virtual receiving array correlation vector h$_{after\_cal}$(k, fs, w). To estimate the number of incoming waves, MDL (Minimum Description Length) or AIC (Akaike Information Criteria), for example, may be used.

In addition, the number of antennas constituting the virtual vertical direction linear array in the virtual receiving array is not limited to three, and the virtual vertical direction linear array can be formed by at least (NW+1) virtual receiving antennas in accordance with the number NW of incoming waves.

When there are a plurality of virtual vertical direction linear arrays which constitute a linear array of three or more antennas in the vertical direction on the virtual receiving array, the direction estimation evaluation function calculation unit 242 extracts a plurality of vertical direction array correlation vectors {h$_{SubV(1)}$(k, fs, w), h$_{SubV(2)}$(k, fs, w), . . . , h$_{SubV(NsubV)}$(k, fs, w)} each composed of the elements included in one of the virtual vertical direction linear arrays and calculates the evaluation function E$_V(\phi^{(1)}, \phi^{(2)}, \ldots, \phi^{(NW)})$, where "N$_{subV}$" represents the number of virtual vertical direction linear arrays of three or more antennas in the vertical direction (the number of vertical direction array correlation vectors).

For example, as the predetermined evaluation function E$_V(\phi^{(1)}, \phi^{(2)}, \ldots, \phi^{(NW)})$ based on the principle of maximum likelihood estimation, the following equations can be used:

$$E_V(\phi^{(1)}, \ldots, \phi^{(NW)}) = \sum_{ns=1}^{N_{subV}} \|h_{SubV(ns)}(k, f_S, w) - A_{SubV(ns)}S_{SubV(ns)}\|^2, \quad (7)$$

$$A_{SubV(ns)} = [a_{SubV(ns)}(\alpha_{SV}, \phi^{(1)}), \ldots, a_{SubV(ns)}(\alpha_{SV}, \phi^{(NW)})], \quad (8)$$

and $$S_{SubV(ns)} = (A^H_{SubV(ns)}A_{SubV(ns)})^{-1}A^H_{SubV(ns)}h_{SubV(ns)}(k, f_S, w). \quad (9)$$

Herein, a$_{SubV}(\alpha_{SV}, \phi_v)$ represents a vertical direction array direction vector and is a direction vector obtained by extracting, from the direction vector a($\theta_u$, $\phi_v$) of the virtual receiving array, the entries corresponding to the elements of the virtual vertical direction linear array among the elements VA #1, . . . , VA #(Nt×Na) included in the virtual receiving array correlation vector h$_{after\_cal}$(k, fs, w). Note that $\alpha_{SV}$ is a fixed direction and may be, for example, the 0° direction or any other direction.

In addition, the direction vector a($\theta_u$, $\phi_v$) is a (Nt×Na)-dimensional column vector of elements which are the complex responses of the virtual receiving array antenna when the radar reflection wave arrives from the azimuth direction $\theta$ and the depression angle direction $\phi$. The complex response $a(\theta_u, \phi_v)$ of the virtual receiving array antenna represents the phase difference calculated by the element interval between the antennas in a geometric optics manner.

That is, the complex response $a(\theta_u, \phi_v)$ of the virtual receiving array antenna is a value uniquely calculated when the arrangement of the virtual receiving array in the radar apparatus 10 is determined. Therefore, the direction estimation evaluation function calculation unit 242 may calculate and store the direction vector $a(\theta_u, \phi_v)$ in advance on the basis of the virtual receiving array arrangement VA #1, ..., VA #(Nt×Na).

Alternatively, the direction estimation evaluation function calculation unit 242 may store, as the direction vector $a(\theta_u, \phi_v)$, the value obtained by measuring the complex response of the virtual receiving array antenna when the radar reflection wave arrives in the azimuth direction $\theta$ and the depression angle direction $\phi$. In this case, since the direction vector $a(\theta_u, \phi_v)$ also includes a deviation depending on the direction between the array antennas, the position estimation processing unit 214 can correct the deviation from the phase calculated ideally in a geometric optics manner at the same time. Thus, more accurate angle measurement processing can be performed.

Herein, $\theta_u$ is a vector that is changed at predetermined horizontal (or azimuth) angular increments of $\beta_1$ in the horizontal (or azimuth) range in which the direction-of-arrival estimation is performed. For example, $\theta_u$ is set as follows:

$\theta_u = \theta_{min} + u\beta_1$, $u=1, \ldots, NU$, and $NU = \text{floor}[(\theta max - \theta min)/\beta_1] + 1$, where floor(x) is a function that returns the largest integer value not exceeding the real number x.

Furthermore, $\phi_v$ is a vector that is changed at predetermined vertical (or depression angle) angular increments of $\beta_2$ in the vertical (or depression angle) range in which the direction-of-arrival estimation is performed. For example, $\phi_v$ is set as follows:

$\phi_v = \phi min + v\beta_2$, $v=1, \ldots, NV$, and $NV = \text{floor}[(\phi max - \phi min)/\beta_2] + 1$.

The angle in the case of sampling within a predetermined depression angle range (the range of the minimum depression angle $\phi$min to the maximum depression angle $\phi$max) at angular increments of $\beta_2$ is referred to as "vertical direction search grid". In addition, the number NV of vertical direction search grids is referred to as a "vertical direction search grid number".

The number of combinations of incoming wave angles equal in number to the number NW of incoming waves taken from the vertical direction search grid number NV is ${}_{NV}C_{NW}$. The direction estimation evaluation function calculation unit 242 calculates the evaluation function $E^V(\phi^{(1)}, \phi^{(2)}, \ldots, \phi^{(NW)})$ for each of the ${}_{NV}C_{NW}$ combinations of angles $\phi$.

The direction estimation evaluation function calculation unit 242 outputs the NW depression angles ($\phi^{(1)}, \phi^{(2)}, \ldots, \phi^{(NW)}$) used for evaluation of the combination of the angles $\phi$ by the evaluation function, the evaluation value $E_V(\phi^{(1)}, \phi^{(2)}, \ldots, \phi^{(NW)})$, and the power estimation values of the NW incoming waves incident in the NW depression angle directions.

The direction estimation evaluation function calculation unit 242 calculates the power estimation value as described below.

$S_{SubV}$ given by Equation (9) is composed of a column vector having NW elements, and each of the elements represents a complex amplitude component estimation value of one of the depression angles $\phi^{(1)}, \phi^{(2)}, \ldots, \phi^{(NW)}$ being evaluated. Therefore, the direction estimation evaluation function calculation unit 242 squares the absolute value of each of the elements of $S_{SubV}$ given by Equation (9). In this manner, the direction estimation evaluation function calculation unit 242 calculates the power estimation values $P_w(\phi^{(1)}), P_w(\phi^{(2)}), \ldots, $ and $P_w(\phi^{(NW)})$ of the incoming waves at the depression angles $\phi^{(1)}, \phi^{(2)}, \ldots, \phi^{(NW)}$ being evaluated, respectively.

Alternatively, when the number $N_{subV}$ of the vertical direction array correlation vectors is 2 or greater, the direction estimation evaluation function calculation unit 242 may calculate the power estimation value for each of $S_{SubV(1)}, S_{SubV(2)}, \ldots, $ and $S_{SubV(NSuvV)}$. Thereafter, the direction estimation evaluation function calculation unit 242 may define the average value of the calculated power estimation values as the power estimation value.

As another example of the evaluation function $E_V(\phi^{(1)}, \phi^{(2)}, \ldots, \phi^{(NW)})$ based on the principle of maximum likelihood estimation, the following equation may be used:

$$E_V(\phi^{(1)}, \ldots, \phi^{(NW)}) = \sum_{ns=1}^{N_{subV}} \|A_{SubV(ns)} S_{SubV(ns)}\|^2. \quad (10)$$

According to Equation (10), the angles that maximize the evaluation function $E_V(\phi^{(1)}, \phi^{(2)}, \ldots, \phi^{(NW)})$ are the maximum likelihood angles.

In addition, among the parameters used for the evaluation function given by Equation (7) or Equation (10), the parameter $(A_{SubH(ns)}{}^H A_{SubH(ns)})^{-1} A_{SubV(ns)}{}^H$, which relates to the direction vector $a(\theta_u, \phi_v)$ and is included in Equation (9), is a value determined depending on the virtual receiving array arrangement and is a fixed value for each of the combinations of angles of $\phi^{(1)}, \phi^{(2)}, \ldots, $ and $\phi^{(NW)}$. The direction estimation evaluation function calculation unit 242 may calculate $(A_{SubV(ns)}{}^H A_{SubV(ns)})^{-1} A_{SubV(ns)}{}^H$ for each of the combination angles of $\phi^{(1)}, \phi^{(2)}, \ldots, $ and $\phi^{(NW)}$ in the vertical direction. Alternatively, the direction estimation evaluation function calculation unit 242 may calculate $(A_{SubV(ns)}{}^H A_{SubV(ns)})^{-1} A_{SubV(ns)}{}^H$ for each of the combination of angles of $\phi^{(1)}, \phi^{(2)}, \ldots, $ and $\phi^{(NW)}$ and store the results of calculation in the form of a table in advance. Subsequently, the direction estimation evaluation function calculation unit 242 may read $(A_{SubV(ns)}{}^H A_{SubV(ns)})^{-1} A_{SubV(ns)}{}^H$ for each of the angles. As a result, although a memory circuit for storing $(A_{SubV(ns)}{}^H A_{SubV(ns)})^{-1} A_{SubV(ns)}{}^H$ is required, the need for an arithmetic circuit, such as a multiplier or an adder, can be eliminated.

Alternatively, the direction estimation evaluation function calculation unit 242 may calculate $(A_{SubV(ns)}{}^H A_{SubV(ns)})_{-1}$ for each of the combination angles of $\phi^{(1)}, \phi^{(2)}, \ldots, $ and $\phi^{(NW)}$ and store the results of calculation in the form of a table in advance. Subsequently, the direction estimation evaluation function calculation unit 242 may read $(A_{SubV(ns)}{}^H A_{SubV(ns)})^{-1}$ for each of the angles. As a result, although a memory circuit for storing $(A_{SubV(ns)}{}^H A_{SubV(ns)})^{-1}$ is required, the need for an arithmetic circuit, such as a multiplier or an adder, for calculating the inverse matrix can be eliminated.

Figure 9A:
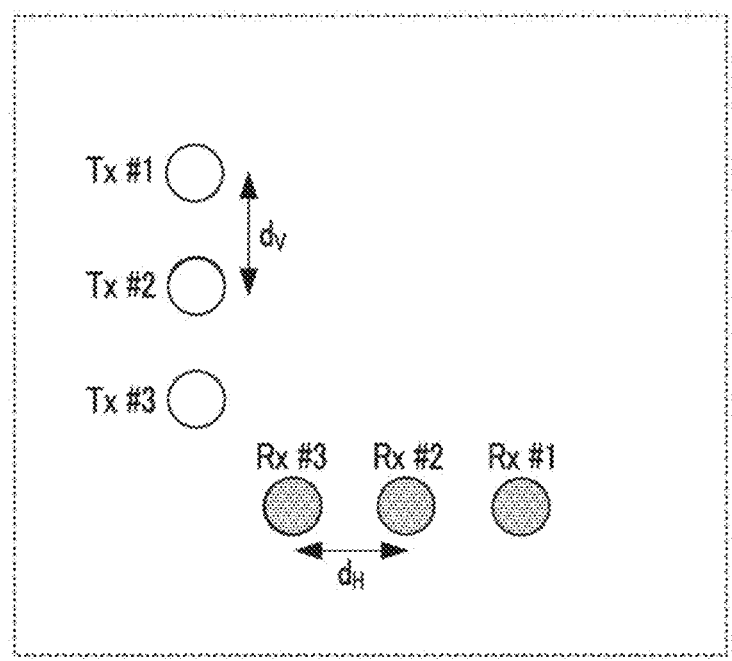
FIG. 9A illustrates an example of arrangement of transmitting and receiving antennas according to an embodiment.
Figure 9B:
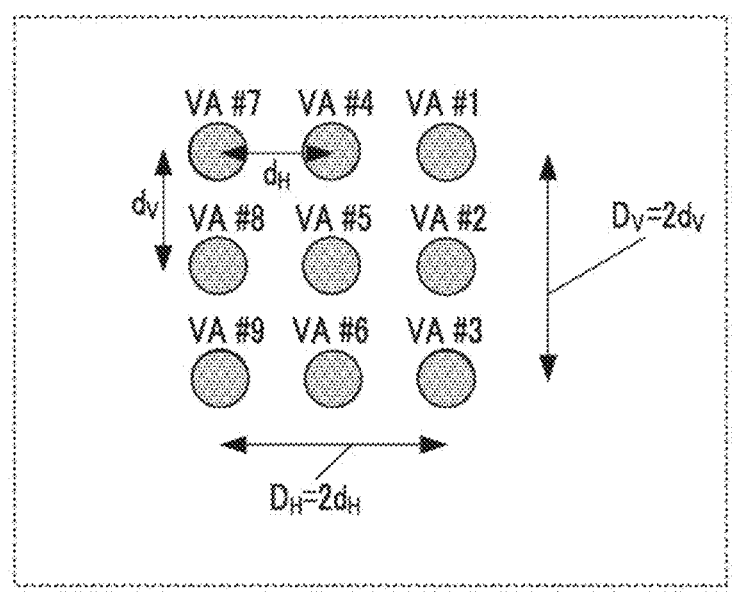
FIG. 9B illustrates an example of the arrangement in a virtual receiving array according to an embodiment.

As an example, the operation performed by the direction estimation evaluation function calculation unit 242 for the example of arrangement of the transmitting antenna 106 and the receiving antenna 202 illustrated in FIGS. 9A and 9B is described below.

In FIG. 9A, the transmitting array antenna has three antennas arranged at equal intervals ($d_V$) in the vertical direction, and the receiving array antenna has three antennas arranged at equal intervals ($d_H$) in the horizontal direction. As a result, as illustrated in FIG. 9B, a virtual receiving array arrangement is obtained that consists of nine antennas arranged in a rectangular shape with three antennas in the horizontal direction and three antennas in the vertical direction. In the virtual receiving array illustrated in FIG. 9B, the aperture lengths $D_H$ and $D_V$ in the horizontal and vertical directions of the antenna are $2d_H$ and $2d_V$, respectively. That is, $D_H=2d_H$, and $D_V=2d_V$.

As illustrated in FIG. 9B, the virtual receiving array has three virtual vertical direction linear arrays each composed of three antennas in the vertical direction (that is, $N_{subV}=3$). Thus, virtual vertical direction linear array correlation vectors $\{h_{SubV(1)}(k, fs, w), h_{SubV(2)}(k, fs, w), h_{SubV(3)}(k, fs, w)\}$ each corresponding to one of the virtual vertical direction linear arrays are obtained. More specifically, in FIG. 9B, the element numbers of the virtual array correlation vectors $h_{\_after\_cal}(k, fs, w)$ included in the vertical direction array correlation vector $\{h_{SubV(1)}(k, fs, w), h_{SubV(2)}(k, fs, w), h_{SubV(3)}(k, fs, w)\}$ are {VA #1, VA #2, VA #3}, {VA #4, VA #5, VA #6}, and {VA #7, VA #8, VA #9}, respectively.

The vertical direction array direction vectors $\{a_{SubV(1)}(\alpha_{SV}, \phi_v), a_{SubV(2)}(\alpha_{SV}, \phi_v), a_{SubV(3)}(\alpha_{SV}, \phi_v)\}$ corresponding to the vertical direction array correlation vectors $\{h_{SubV(1)}(k, fs, w), h_{SubV(2)}(k, fs, w), h_{SubV(3)}(k, fs, w)\}$ are column vectors generated by extracting the element numbers {VA #1, VA #2, VA #3}, {VA #4, VA #5, VA #6}, and {VA #7, VA #8, VA #9} of the direction vector $a(\theta_u, \phi_v)$ of the virtual receiving array, respectively.

The direction estimation evaluation function calculation unit 242 calculates the evaluation function $E_V$ (for example, Equation (7) or Equation (10)) by using the vertical direction array correlation vectors $\{h_{SubV(1)}(k, fs, w), h_{SubV(2)}(k, fs, w), h_{SubV(3)}(k, fs, w)\}$.

Operation Performed by Maximum Likelihood Value Extraction Unit

The maximum likelihood value extraction unit 243 extracts the angle of arrival in the vertical direction (the depression angle) of the reflected wave signal by using the reflected wave signal of the virtual vertical direction linear array composed of the receiving antennas arranged linearly in the vertical direction among the plurality of receiving antennas constituting the virtual receiving array.

More specifically, the maximum likelihood value extraction unit 243 extracts a combination of angles that provide the maximum likelihood value of the evaluation function $E_V(\phi^{(1)}, \phi^{(2)}, \ldots, \phi^{(NW)})$ (the angles at which the evaluation function $E_V$ becomes minimum or maximum) on the basis of the output of the direction estimation evaluation function calculation unit 242. Thereafter, the maximum likelihood value extraction unit 243 outputs, as the direction estimation value of the angle of arrival (the depression angle), the maximum likelihood value $E_{VML}$ of the evaluation function $E_V(\phi^{(1)}, \phi^{(2)}, \ldots, \phi^{(NW)})$ and the combination of depression angles $(\phi_{ML}^{(1)}, \phi_{ML}^{(2)}, \ldots,$ and $\phi_{ML}^{(NW)})$ that provide the maximum likelihood value. Note that the maximum likelihood value $E_{VML}$ satisfies the following equation:

$$E_{VML}=E_V(\phi_{ML}^{(1)}, \phi_{ML}^{(2)}, \ldots, \phi_{ML}^{(NW)}) \quad (11).$$

That is, the maximum likelihood value extraction unit 243 extracts, as the angle of arrival (the direction of arrival) of the reflected wave signal from the target, NW maximum likelihood angles $\phi_{ML}^{(1)}, \phi_{ML}^{(2)}, \ldots,$ and $\phi_{ML}^{(NW)}$ in the vertical direction corresponding to the maximum likelihood value $E_{VML}$ calculated by the direction estimation evaluation function calculation unit 242 through the maximum likelihood estimation process for the vertical direction.

In addition, the maximum likelihood value extraction unit 243 outputs, to the angle spread detection unit 244, the maximum likelihood value $E_{VML}$, the combination of depression angles (the maximum likelihood angles) $\phi_{ML}^{(1)}, \phi_{ML}^{(2)}, \ldots, \phi_{ML}^{(NW)}$ that provide the maximum likelihood value, and the power estimation values $P_w(\phi_{ML}^{(1)})$, $P_w(\phi_{ML}^{(2)}), \ldots,$ and $P_w(\phi_{ML}^{(NW)})$ of the NW incoming waves in NW depression angle directions corresponding to the maximum likelihood value.

Operation Performed by Angle Spread Detection Unit

The angle spread detection unit 244 uses the reflected wave signal of the virtual vertical direction linear array composed of the receiving antennas arranged linearly in the vertical direction among the plurality of receiving antennas constituting the virtual receiving array to detect the angle spread of the reflected wave signal with respect to the angle of arrival of the reflected wave signal (that is, the maximum likelihood angle).

The angle spread detection unit 244 detects the angle spread of the incoming wave on the basis of the output of the direction estimation evaluation function calculation unit 242 and the output of the maximum likelihood value extraction unit 243. The processing performed by the angle spread detection unit 244 is described in detail below.

The angle spread detection unit 244 extracts the combination of depression angles that makes the evaluation function $E^V(\phi^{(1)}, \phi^{(2)}, \ldots, \phi^{(NW)})$ equal to a local maximum likelihood value (the extremum) on the basis of the evaluation functions $E_V(\phi^{(1)}, \phi^{(2)}, \ldots, \phi^{(NW)})$ obtained by changing the NW depression angles $(\phi^{(1)}, \phi^{(2)}, \ldots, \phi^{(NW)})$ in the vertical direction search grids among the outputs of the direction estimation evaluation function calculation unit 242.

In addition, the angle spread detection unit 244 uses the output of the maximum likelihood value extraction unit 243 (e.g., the maximum likelihood value $E_{VML}$) to extract the combination of depression angles that provides the local maximum likelihood value (the extremum) satisfying the conditions 1) and 2) described below. Hereinafter, the angles corresponding to the local maximum likelihood value (the extremum) extracted on the basis of the output of the maximum likelihood value extraction unit 243 are referred to as "extremum angles". At least the combination of depression angles $(\phi_{ML}^{(1)}, \phi_{ML}^{(2)}, \ldots, \phi_{ML}^{(NW)})$ that makes the evaluation function equal to the maximum likelihood value $E_{VML}$ is included in the extremum angles. The angle spread detection unit 244 outputs extremum angles equal in number to the predetermined number $N_{VLimit}$ or lower.

1) The case where the minimum value of a predetermined evaluation function based on the principle of maximum likelihood estimation is the maximum likelihood value (the case where the evaluation function given by Equation (7) is used)

The angle spread detection unit 244 extracts, as extremum angles, angles $[\phi_{NLM}^{(1)}, \phi_{NLM}^{(2)}, \ldots, \phi_{NLM}^{(NW)}]$ corresponding to the local minimum value (the minimal value) $E_V(\phi^{(1)}, \phi^{(2)}, \ldots, \phi^{(NW)})$ that satisfies the following condition:

$$E_V(\phi^{(1)}, \phi^{(2)}, \ldots, \phi^{(NW)}) < \alpha_V \times E_{VML} \quad (12).$$

Note that NLM=1, $\ldots, N_{VLocalML}$.

Herein, $\alpha_V$ is a predetermined value ($\alpha_V > 1$).

If the number of extremum angles that satisfy the condition defined by Expression (12) exceeds the predetermined number $N_{VLimit}$ ($N_{VLocalML} > N_{VLimit}$), the angle spread detection unit 244 may give priority to an angle with a smaller evaluation value and output $N_{VLimit}$ or fewer candidates.

2) The case where the maximum value of the predetermined evaluation function based on the principle of the maximum likelihood estimation is the maximum likelihood value (the case where the evaluation function expressed by Equation (10) is used]

The angle spread detection unit 244 extracts, as the extremum angles, the angles $[\phi_{NLM}^{(1)}, \phi_{NLM}^{(2)}, \ldots, \phi_{NLM}^{(NW)}]$ corresponding to the local maximum value (the maximal value) $E_V(\phi^{(1)}, \phi^{(2)}, \ldots, \phi^{(NW)})$ that satisfies the following condition:

$$E_V(\phi^{(1)}, \phi^{(2)}, \ldots, \phi^{(NW)}) > \alpha_V \times E_{VML} \quad (13).$$

Note that $NLM=1, \ldots, N_{VLocalML}$.

Herein, $\alpha_V$ is a predetermined value ($\alpha_V < 1$).

If the number of extremum angles that satisfy the condition defined by Expression (13) exceeds the predetermined number $N_{VLimit}$ ($N_{VLocalML} > N_{VLimit}$), the angle spread detection unit 244 may give priority to an angle with a larger evaluation value and output $N_{VLimit}$ or fewer candidates.

The angle spread detection unit 244 performs angle spread detection on the basis of the extremum angles $[\phi_{NLM}^{(1)}, \phi_{NLM}^{(2)}, \ldots, \phi_{NLM}^{(NW)}]$ that satisfy the above-described condition. Note that $NLM \leq N_{VLimit}$.

The extremum angles $[\phi_{NLM}^{(1)}, \phi_{NLM}^{(2)}, \ldots, \phi_{NLM}^{(NW)}]$ which become extremum values within a range of a predetermined size from the maximum likelihood value of the evaluation function (for example, a range that satisfies the condition defined by Equation (12) or (13)) can be considered to form a reflected wave group generated by the reflected waves scattering around the depression angle (the maximum likelihood angle) direction which is the maximum likelihood value. Accordingly, the angle spread detection unit 244 detects the spread angle of such a reflected wave group as "angle spread".

The angle spread detection process performed by the angle spread detection unit 244 is described in detail below.

Step (1)

The angle spread detection unit 244 extracts the largest one of the power estimation values $P_w(\phi_{ML}^{(1)})$, $P_w(\phi_{ML}^{(2)}), \ldots$, and $P_w(\phi_{ML}^{(NW)})$ of the incoming waves in the NW depression angle directions that make the evaluation function equal to the maximum likelihood value $E_{VML}$. In addition, by using the extracted power estimation value, the angle spread detection unit 244 calculates a normalized power estimation value obtained by normalizing each of the power estimation values of the incoming waves in the NW depression angle directions. Thereafter, the angle spread detection unit 244 extracts a depression angle direction in which the normalized power estimation value is greater than or equal to a predetermined value.

Note that the angle spread detection unit 244 may extract, from among the power estimation values $P_w(\phi_{ML}^{(1)})$, $P_w(\phi_{ML}^{(2)}), \ldots$, and $P_w(\phi_{ML}^{(NW)})$ of the incoming waves in the NW depression angle directions that make the evaluation function equal to the maximum likelihood value $E_{VML}$, one greater than or equal to a predetermined value (that is, the normalization process is not performed).

Step (2)

The angle spread detection unit 244 obtains the frequency distribution of NLM ($\leq N_{VLimit}$) sets of the extremum angles $[\phi_{NLM}^{(1)}, \phi_{NLM}^{(2)}, \ldots, \phi_{NLM}^{(NW)}]$ with respect to the vertical direction search grids.

Figure 10:
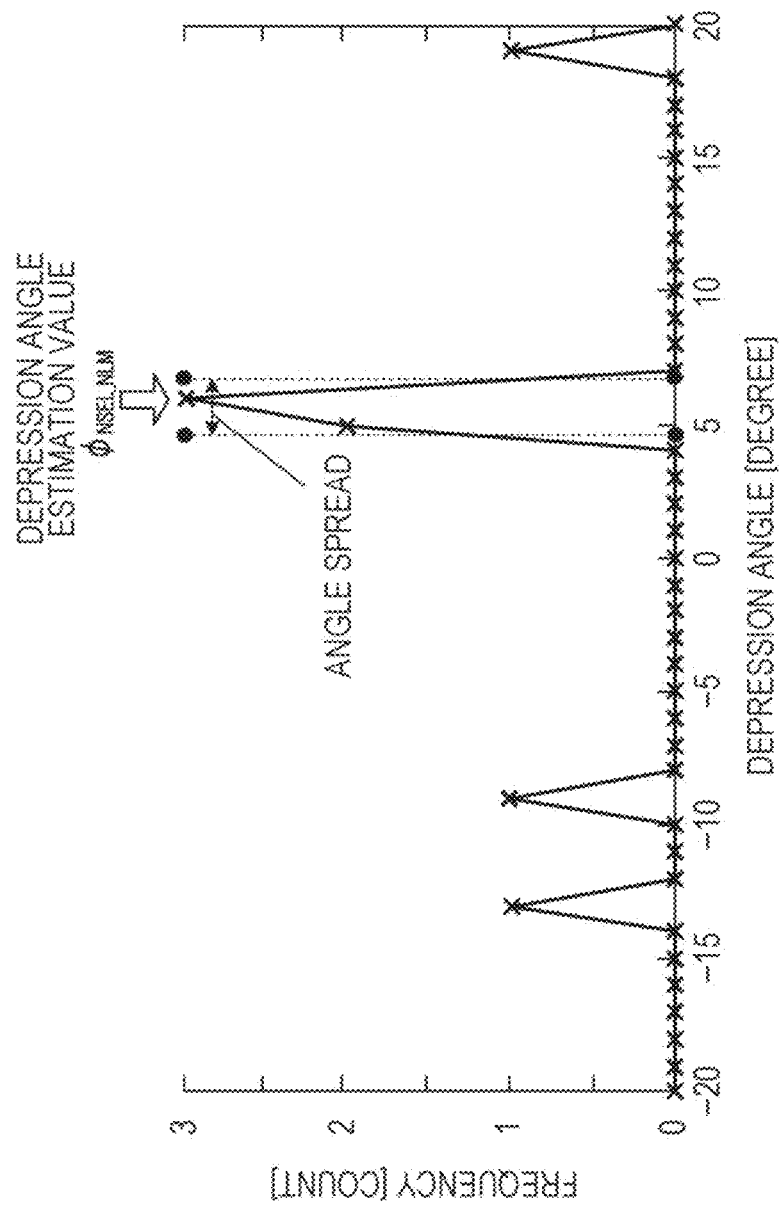
FIG. 10 illustrates an example of an angle spread detection process according to an embodiment.

FIG. 10 illustrates the distribution of the extremum angles $[\phi_{NLM}^{(1)}, \phi_{NLM}^{(2)}]$ required when NW=2 in step (2) in the case where the number of incoming waves at depression angles at which the normalized power estimation value of the incoming wave extracted in step (1) is less than or equal to the predetermined value is one and the depression angle of the incoming wave (referred to as "$\phi_{NSEL\_NLM}$") is 6°. In FIG. 10, the abscissa represents the vertical direction search grid in the case where the depression angle range is ±20°, and the angular increment (an angle interval) $\beta_2=1°$. The ordinate represents the frequency count for each of the vertical direction search grids included in the extracted extremum angles $[\phi_{NLM}^{(1)}, \phi_{NLM}^{(2)}, \ldots, \phi_{NLM}^{(NW)}]$.

Step (3)

The angle spread detection unit 244 detects, as "$N_{GRID\_ON\_minus}$" and "$N_{GRID\_ON\_plus}$", the numbers of continuous vertical direction search grids including the depression angle direction $\phi_{NSEL\_NLM}$ extracted in step (1) and each having a frequency count of 1 or greater preceding and succeeding the depression angle direction $\phi_{NSEL\_NLM}$, respectively.

In FIG. 10, the number $N_{GRID\_ON\_minus}$ of vertical direction search grids including the depression angle direction $\phi_{NSEL\_NLM}$ (the depression angle: 6°) and each having a frequency count of 1 or greater on the negative side of the depression angle direction $\phi_{NSEL\_NLM}$ is 2 (that is, the grids corresponding to depression angles of 6° and 5°). In addition, in FIG. 10, the number $N_{GRID\_ON\_plus}$ of vertical direction search grids including the depression angle direction $\phi_{NSEL\_NLM}$ (the depression angle: 6°) and each having a frequency count of 1 or greater on the positive side of the depression angle direction $\phi_{NSEL\_NLM}$ is 1 (that is, the grid corresponding to a depression angle of 6°).

Subsequently, the angle spread detection unit 244 calculates an angular spread angle $AS_{minus}(\phi_{NSEL\_NLM})$ (degrees) on the negative side of the depression angle direction $\phi_{NSEL\_NLM}$ and an angular spread angle $AS_{plus}(\phi_{NSEL\_NLM})$ (degrees) on the positive side of the depression angle direction $\phi_{NSEL\_NLM}$ for the incoming wave incident in the depression angle direction $\phi_{NSEL\_NLM}$ by using, for example, the following equations:

$$AS_{minus}(\phi_{NSEL\_NLM}) = (N_{GRID\_ON\_minus} - 0.5) \times \beta_2 \quad (14), \text{ and}$$

$$AS_{plus}(\phi_{NSEL\_NLM}) = (N_{GRID\_ON\_plus} - 0.5) \times \beta_2 \quad (15),$$

where $\beta_2$ is the angular interval of the vertical direction search grid.

In FIG. 10, $\phi_{NSEL\_NLM}=6°$, $N_{GRID\_ON\_minus}=2$, $N_{GRID\_ON\_plus}=1$, and $\beta_2=1°$. Accordingly, the angle spread detection unit 244 performs estimation so that $AS_{minus}(6°)=1.5°$ by Equation (14) and $AS_{plus}(6°)=0.5°$ by Equation (15).

In this manner, the angle spread detection unit 244 extracts NW extremum angles corresponding to at least one extremum (local maximum likelihood value) including the maximum likelihood value $E_{VML}$ of the evaluation function $E_V$ used for the maximum likelihood estimation process. Thereafter, the angle spread detection unit 244 calculates the angle spread ($AS_{minus}(\phi_{NSEL\_NLM})$, $AS_{plus}(\phi_{NSEL\_NLM})$) on the basis of the distribution of the extremum angle $\phi_{NLM}$ around the maximum likelihood angle $\phi_{NSEL\_NLM}$ in the vertical direction.

Modification of Step (3)

As another method for use in step (3), the angle spread detection unit 244 may estimate the angle spread by using the weighting according to the frequency count for each of the vertical direction search grids.

More specifically, the angle spread detection unit 244 detects, as "$N_{GRID\_ON\_minus}$" and "$N_{GRID\_ON\_plus}$", the numbers of vertical direction search grids including the depression angle direction $\phi_{NSEL\_NLM}$ and each having a frequency count of 1 or greater around (on the negative side and positive side of) the depression angle direction $\phi_{NSEL\_NLM}$ extracted in step (1), respectively.

Note that the frequency in each of the vertical direction search grids within the range of $N_{GRID\_ON\_minus}$ is denoted as $N_{hist\_minus}(ngrid_{minus})$, where $ngrid_{minus}=1, \ldots, N_{GRID\_ON\_minus}$. Similarly, the frequency in each of the vertical direction search grids within the range of $N_{GRID\_ON\_plus}$ is denoted as $N_{hist\_plus}(ngrid_{plus})$, where $ngrid_{plus}=1, \ldots, N_{GRID\_ON\_plus}$.

Subsequently, the angle spread detection unit 244 calculates an angular spread angle $AS_{minus}(\phi_{NSEL\_NLM})$ (degrees) on the negative side of the depression angle direction $\phi_{NSEL\_NLM}$ and an angular spread angle $AS_{plus}(\phi_{NSEL\_NLM})$ (degrees) on the positive side of the depression angle direction $\phi_{NSEL\_NLM}$ for the incoming wave incident in the depression angle direction $\phi_{NSEL\_NLM}$ by using the following equations:

$$AS_{minus}(\phi_{NSEL\_NLM}) = \frac{1}{N_{sum\_minus}} \sum_{ngrid_{minus}=1}^{N_{GRID\_ON\_minus}} N_{hist\_minus}(ngrid_{minus}) \times \{(ngrid_{minus} - 0.5)\beta_2\}^2, \quad (16)$$

$$AS_{plus}(\phi_{NSEL\_NLM}) = \frac{1}{N_{sum\_plus}} \sum_{ngrid_{plus}=1}^{N_{GRID\_ON\_plus}} N_{hist\_plus}(ngrid_{plus}) \times \{(ngrid_{plus} - 0.5)\beta_2\}^2, \quad (17)$$

$$\frac{1}{N_{sum\_minus}} = \sum_{ngrid_{minus}=1}^{N_{GRID\_ON\_minus}} N_{hist\_minus}(ngrid_{minus}), \quad (18)$$

and $$\frac{1}{N_{sum\_plus}} = \sum_{ngrid_{plus}=1}^{N_{GRID\_ON\_plus}} N_{hist\_plus}(ngrid_{plus}), \quad (19)$$

where $\beta_2$ is the angular interval of the vertical direction search grid.

That is, in Equation (16) and Equation (17), the angle spread detection unit 244 performs the weighting such that the calculated angle spread increases with increasing frequencies $N_{hist\_minus}(ngrid_{minus})$ and $N_{hist\_plus}(ngrid_{plus})$ for each of the vertical direction search grids within the ranges of $N_{GRID\_ON\_minus}$ and $N_{GRID\_ON\_plus}$, respectively.

In step (3) or the modification of step (3), when the angular interval of the vertical direction search grid is coarse, the frequency count for each of the vertical direction search grids tends to be discontinuous. Therefore, the angle spread detection unit 244 may detect, as the angle spread, the angle range in which continuous Ngate vertical direction search grids have non-zero frequency count. Note that Ngate>1.

Operation Performed by Target Height Estimation Unit

The target height estimation unit 245 estimates the target height on the basis of the output of the angle spread detection unit 244.

More specifically, the target height estimation unit 245 converts the arrival delay time detected using the received reflected wave signal into a distance. Thereafter, the target height estimation unit 245 estimates a target height Hest by using the depression angle direction $\phi_{NSEL\_NLM}$ detected by the angle spread detection unit 244, the angular spread angles $AS_{minus}(\phi_{NSEL\_NLM})$ and $AS_{plus}(\phi_{NSEL\_NLM})$ (degrees) around the depression angle direction $\phi_{NSEL\_NLM}$ of the incoming wave incident in the depression angle direction $\phi_{NSEL\_NLM}$, and a distance $R_m$ converted from an arrival delay time k of the detected incoming wave.

Figure 11:
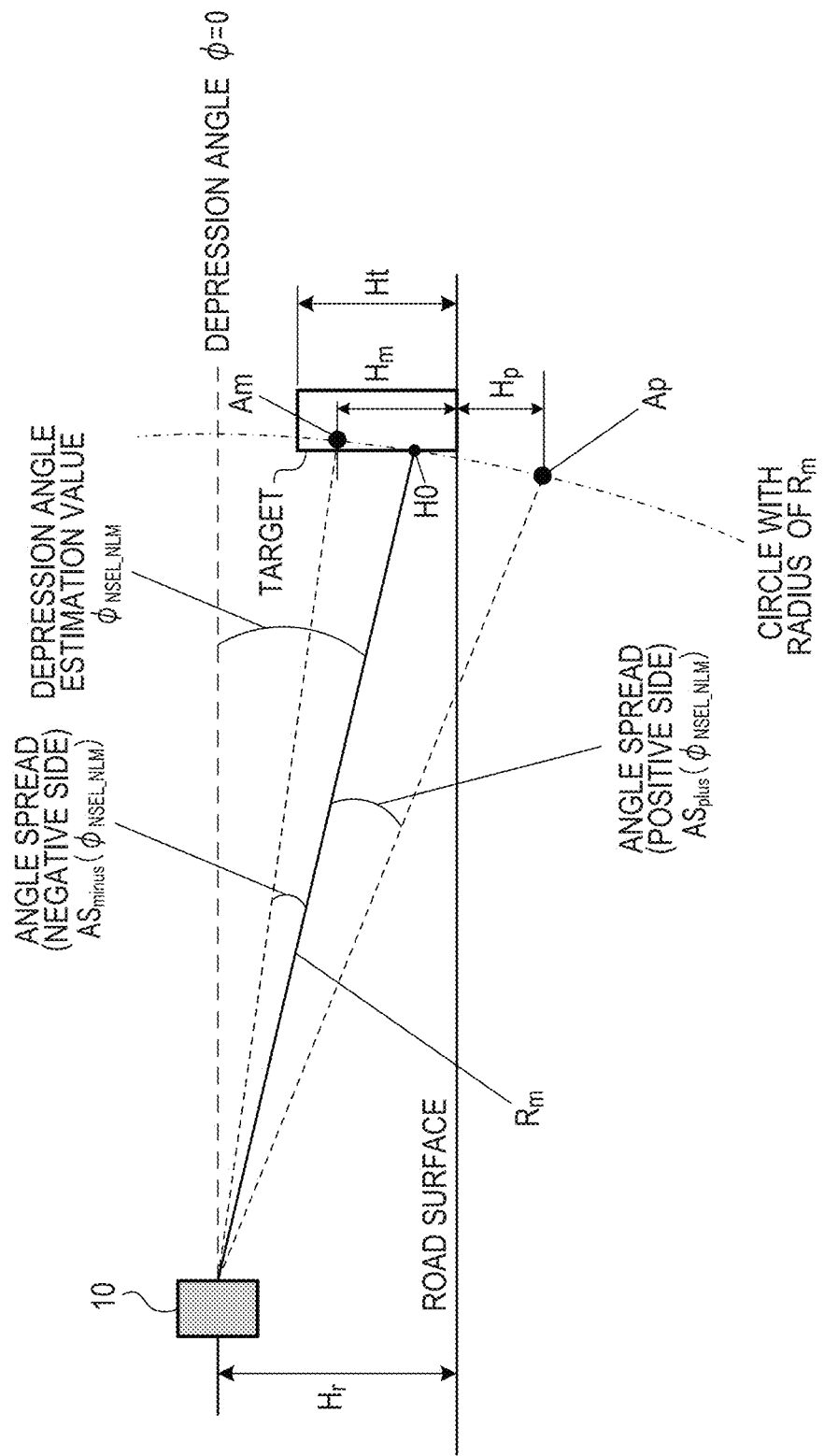
FIG. 11 illustrates an example of a target height estimation process according to an embodiment.
Figure 12:
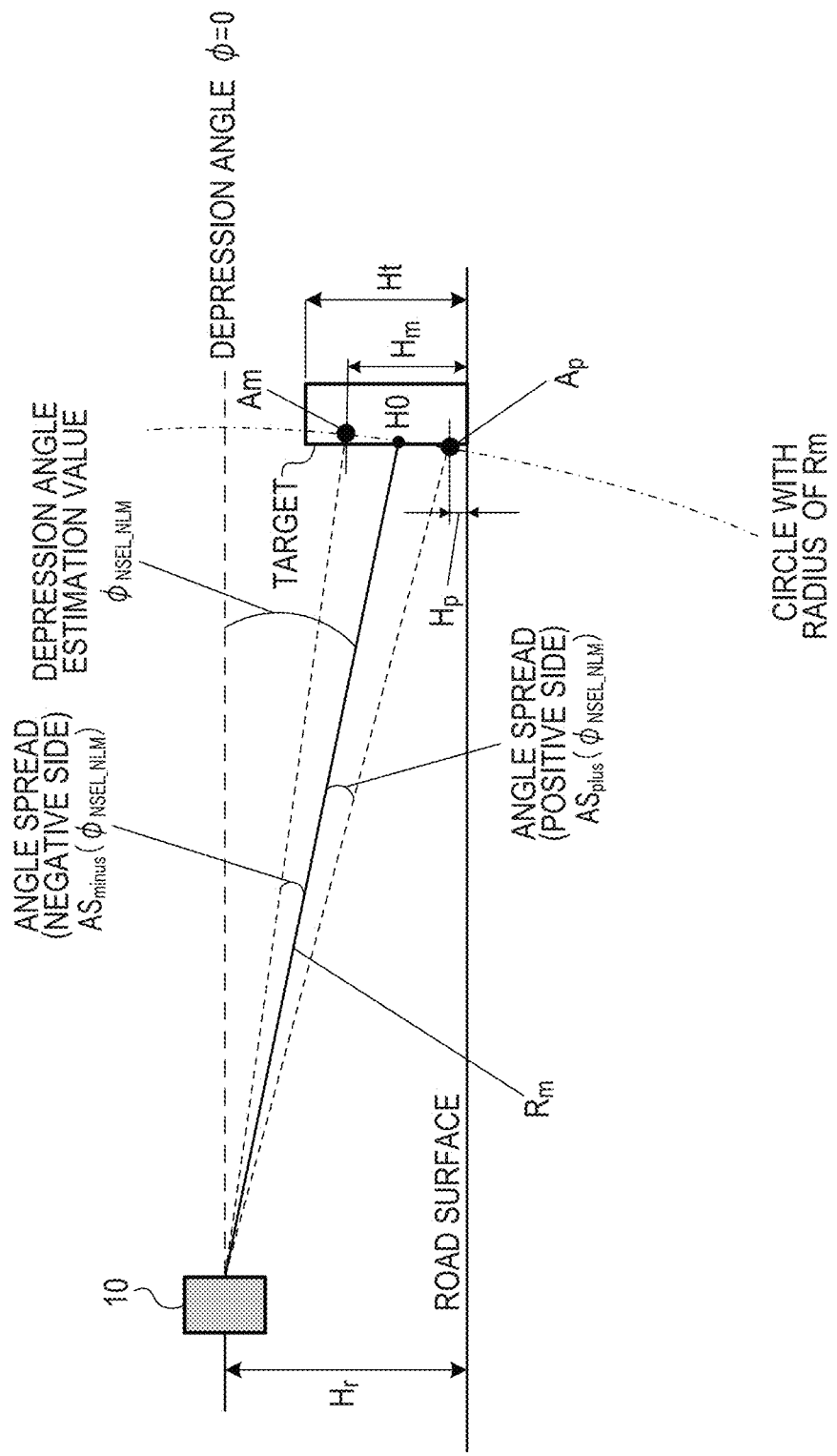
FIG. 12 illustrates an example of a target height estimation process according to an embodiment.
Figure 13:
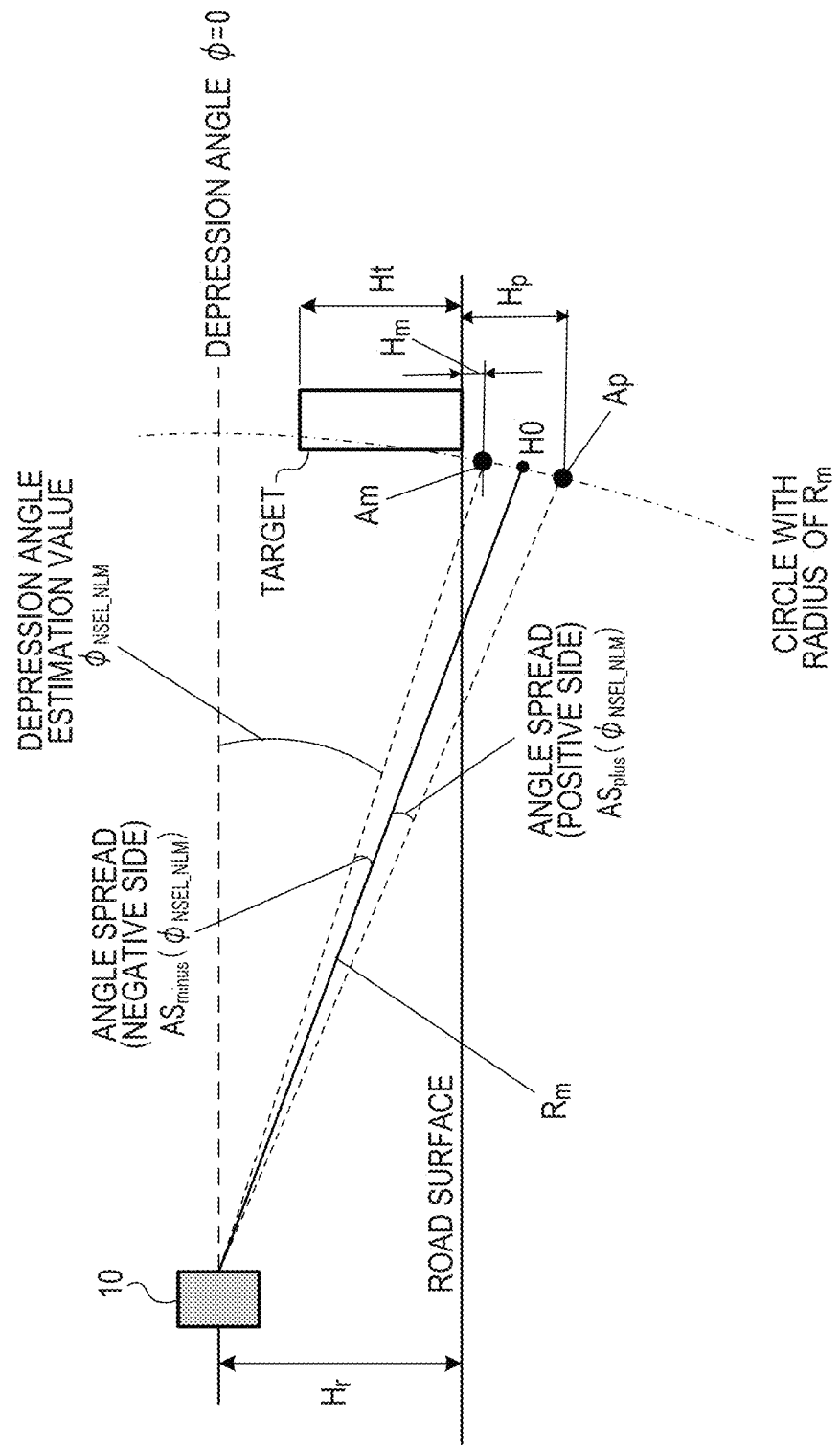
FIG. 13 illustrates an example of a target height estimation process according to an embodiment.

The height estimation process performed by the target height estimation unit 245 is described in detail below with reference to FIGS. 11, 12, and 13. In FIGS. 11, 12, and 13, the radar installation height $H_r$ of the radar apparatus 10 is already known.

The target height estimation unit 245 calculates an angle spread estimation value $H_p$ on the positive side of the depression angle and an angle spread estimation value $H_m$ on the negative side of the depression angle for the angular spread angles $AS_{minus}(\phi_{NSEL\_NLM})$ and $AS_{plus}(\phi_{NSEL\_NLM})$ [degrees] around the depression angle direction $\phi_{NSEL\_NLM}$, respectively, as follows:

$$H_p(R_m, \phi_{NSEL\_NLM}, AS_{plus}(\phi_{NSEL\_NLM}), H_r) = H_r - R_m \sin(\phi_{NSEL\_NLM} + AS_{plus}(\phi_{NSEL\_NLM})) \quad (20), \text{ and}$$

$$H_m(R_m, \phi_{NSEL\_NLM}, AS_{minus}(\phi_{NSEL\_NLM}), H_r) = H_r - R_m \sin(\phi_{NSEL\_NLM} - AS_{minus}(\phi_{NSEL\_NLM})) \quad (21).$$

That is, as illustrated in FIGS. 11, 12, and 13, the target height estimation unit 245 defines the height of the road surface as a reference (zero) and estimates, as the angle spread estimation value $H_p$ on the positive side of the depression angle, the height of an intersection point Ap of a circle having the center at the radar apparatus 10 and a radius $R_m$ and a depression angle "$\phi_{NSEL\_NLM} + AS_{plus}(\phi_{NSEL\_NLM})$" direction.

Similarly, as illustrated in FIGS. 11, 12, and 13, the target height estimation unit 245 defines the height of the road surface as a reference (zero) and estimates, as the angle spread estimation value $H_m$ on the positive side of the depression angle, the height of an intersection point Am of a circle having the center thereof at the radar apparatus 10 and a radius $R_m$ and a depression angle "$\phi_{NSEL\_NLM} - AS_{plus}(\phi_{NSEL\_NLM})$" direction.

Note that $AS_{minus}(\phi_{NSEL\_NLM}) > 0$, and $AS_{plus}(\phi_{NSEL\_NLM}) > 0$.

Since the angle spread estimation values $H_m$ and $H_p$ include a road surface reflection component reflected by the target and, thereafter, reflected by the road surface, the angle spread estimation values $H_m$ and $H_p$ may be negative values in order to detect the height of the mirror image of the target.

For this reason, if, as illustrated in FIG. 11, $H_m \geq 0$ and $H_p \leq 0$, the target height estimation unit 245 outputs, as the target height estimation value $Hest(R_m, \phi_{NSEL\_NLM})$ of the target located at the distance $R_m$ in the direction $\phi_{NSEL\_NLM}$, the angle spread estimation value $H_m$ or the angle spread estimation value $H_p$, whichever the absolute value is greater. That is, if $H_m \geq |H_p|$, the target height estimation unit 245 sets $Hest(R_m, \phi_{NSEL\_NLM})$ to $H_m$. However, if $H_m < |H_p|$, the target height estimation unit 245 sets $Hest(R_m, \phi_{NSEL\_NLM})$ to $|H_p|$.

As illustrated in FIG. 12, if $H_m > 0$ and $H_p > 0$, the target height estimation unit 245 outputs, as the target height estimation value $Hest(R_m, \phi_{NSEL\_NLM})$ of the target located at the distance $R_m$ in the direction $\phi_{NSEL\_NLM}$, the angle spread estimation value $H_m$. That is, the target height estimation unit 245 sets $Hest(R_m, \phi_{NSEL\_NLM})$ to $H_m$.

As illustrated in FIG. 13, if $H_m < 0$ and $H_p < 0$, the target height estimation unit 245 outputs, as the target height estimation value $Hest(R_m, \phi_{NSEL\_NLM})$ of the target located at the distance $R_m$ in the direction $\phi_{NSEL\_NLM}$, the absolute value of the angle spread estimation value $H_p$. That is, the target height estimation unit 245 sets Hest($R_m$, $\phi_{NSEL\_NLM}$) to $|H_p|$.

The operation performed by the position estimation processing unit 214 has been described above.

As described above, in the position estimation processing unit 214, the maximum likelihood value extraction unit 243 selects, from among the plurality of receiving antennas (from the virtual receiving array in this example), the virtual vertical direction linear array arranged linearly in the vertical direction and uses the reflected wave signal of the virtual vertical direction linear array to extract the angle of arrival of the reflected signal in the vertical direction. The angle spread detection unit 244 uses the reflected wave signal of the virtual vertical direction linear array to detect the angle spread in the vertical direction for the angle of arrival of the reflected wave signal. Thereafter, the target height estimation unit 245 estimates the position of the target in the vertical direction (that is, the target height) by using the angle of arrival and the angle spread.

Thus, the position estimation processing unit 214 can estimate the target height on the basis of the result of distance measurement of the incoming wave and the radar installation height condition in addition to the result of estimation of the direction of arrival. That is, the position estimation processing unit 214 can estimate even the target height that is lower than the radar installation height of the radar apparatus 10 in consideration of the road reflected wave (that is, the angle spread) in addition to the direct reflected wave.

As a result, even when receiving the indirect reflected wave from the target via the road surface in addition to the direct reflected wave from the target, the radar apparatus 10 can improve the accuracy of estimation of the target height. Therefore, when, for example, the radar apparatus 10 is mounted in a vehicle or the like and collision determination is made, the radar apparatus 10 can accurately estimate the height of target that is low, such as a curb or block and, thus, the collision determination can be correctly made.

In addition, the radar apparatus 10 calculates at least one extremum including the maximum likelihood value through the maximum likelihood value process for the vertical direction by using the received reflected wave signal. Thereafter, the radar apparatus 10 estimates the angle spread around the maximum likelihood angle direction corresponding to the maximum likelihood value by using the calculated value. Consequently, for example, even when the vehicle having the radar apparatus 10 mounted therein is stopped or even when the target is located on the side of the vehicle, the radar apparatus 10 can accurately estimate the target height.

While the above example has been described with reference to the position estimation processing unit 214 that outputs, as the target height, the height from the road surface in the height estimation, the position estimation processing unit 214 may output the vertical width of the target (a target vertical width WV). Alternatively, the position estimation processing unit 214 may output the vertical width of the target (a target vertical width WV) together with the target height.

For example, the position estimation processing unit 214 outputs the vertical width of the target as follows. That is, as illustrated in FIG. 11, if $H_m \geq 0$ and $H_p \leq 0$, the position estimation processing unit 214 outputs, as the target vertical width WV, $H_m$ or $H_p$, whichever the absolute value is greater. That is, if $H_m \geq |H_p|$, the position estimation processing unit 214 sets WV to $H_m$. However, if $H_m < |H_p|$, the position estimation processing unit 214 sets WV to $|H_p|$. In addition, as illustrated in FIG. 12, if $H_m > 0$ and $H_p > 0$, the position estimation processing unit 214 outputs the target vertical width WV=$H_p$−$H_m$. Furthermore, as illustrated in FIG. 13, if $H_m < 0$ and $H_p < 0$, the position estimation processing unit 214 outputs the target vertical width WV=$H_p$−$H_m$.

Modification 1 of Embodiment

The above embodiment has been described with reference to the case in which the road surface extending between the radar apparatus 10 and the target does not slope or slopes so gently that estimation of the target height performed by the radar apparatus 10 is not effected. Modification 1 of the embodiment is described below with reference to the case where the road surface extending between the radar apparatus 10 and the target slopes.

Figure 14:
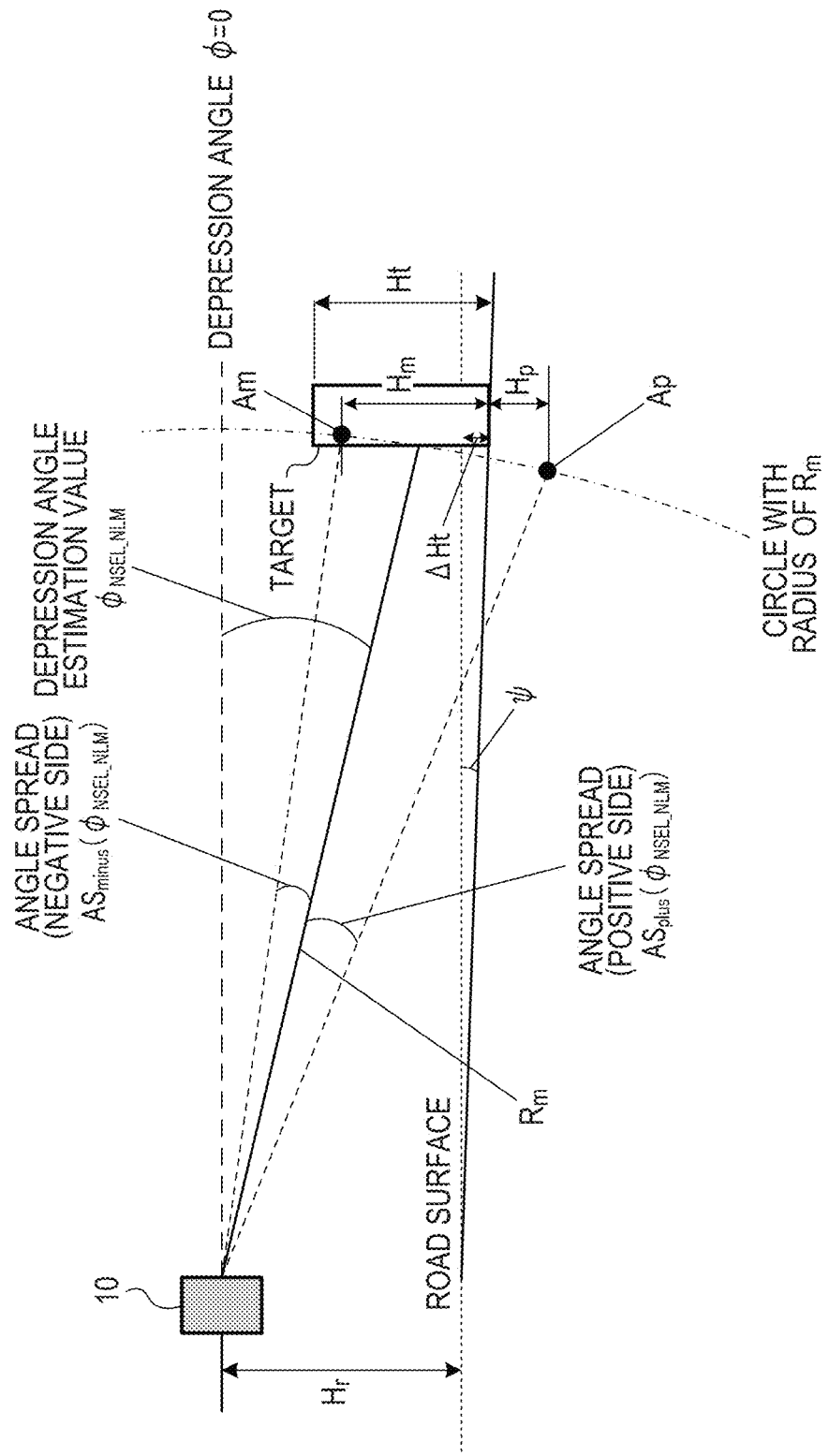
FIG. 14 illustrates an example of a target height estimation process according to modification 1.

FIG. 14 illustrates an example of the target height estimation process performed when the road surface extending between the radar apparatus 10 and the target slopes at a road surface slope angle $\psi$.

If the road surface extending between the radar apparatus 10 and the target slopes, the radar apparatus 10 may be installed such that the direction normal to the surface of the antenna installed in the vertical direction of the radar apparatus 10 (hereinafter, the direction is referred to as a "radar axis") is parallel to the sloped road surface. That is, the radar apparatus 10 is disposed such that the depression angle $\phi$ of the radar axis is the same as the road surface slope angle $\psi$ (note that the direction of depression angle is defined as being positive). In this case, the radar apparatus 10 can consider that the road surface is not sloped and, thus, can estimate the target height through the above-described operation performed by the target height estimation unit 245.

Alternatively, if the radar axis of the radar apparatus 10 is set at a depression angle $\phi=0°$ or if a correction is performed so that the depression angle direction estimation value corresponds to the depression angle $\phi=0°$ with respect to the depression angle "$\phi=0°$" direction, the radar apparatus 10 (the target height estimation unit 245 illustrated in FIG. 8) may correct the angle spread estimation values $H_p$ and $H_m$ in consideration of the road surface slope angle $\psi$ as indicated by the following equations (22) and (23), instead of Equations (20) and (21):

$$H_p(R_m, \phi_{NSEL\_NLM}, AS_{plus}(\phi_{NSEL\_NLM}), H_r) = H_r - R_m \sin(\phi_{NSEL\_NLM} + AS_{plus}(\phi_{NSEL\_NLM})) - R_m \cos(\phi_{NSEL\_NLM})\tan(\psi) \quad (22), \text{ and}$$

$$H_m(R_m, \phi_{NSEL\_NLM}, AS_{minus}(\phi_{NSEL\_NLM}), H_r) = H_r - R_m \sin(\phi_{NSEL\_NLM} - AS_{minus}(\phi_{NSEL\_NLM})) + R_m \cos(\phi_{NSEL\_NLM})\tan(\psi) \quad (23).$$

Thereafter, the radar apparatus 10 may estimate the target height.

Note that a road surface slope angle $\psi$ that is a depression angle is defined as being positive. In the case where the road surface slope angle $\psi$ is positive, the target height needs to be corrected by $R_m \times \cos(\phi_{NSEL\_NLM})\tan(\psi)$ for the distance $R_m \times \cos(\phi_{NSEL\_NLM})$ to the target in accordance with the road slope, as illustrated in FIG. 14. If the target height estimation unit 245 uses $H_p$ indicated by Equation (20), the target height is estimated as a value that is higher than the actual value by $R_m \times \cos(\phi_{NSEL\_NLM})\tan(\psi)$ corresponding to the road slope. Accordingly, in Equation (22), the target height estimation unit 245 subtracts a correction term $\Delta Ht = R_m \times \cos(\phi_{NSEL\_NLM})\tan(\psi)$ from $H_p$ given by Equation (20). In addition, if the target height estimation unit 245 uses $H_m$ given by Equation (21), the target height is estimated as a value that is lower than the actual value by $R_m \times \cos(\phi_{NSEL\_NLM})\tan(\psi)$ corresponding to the road slope. Accordingly, in Equation (23), the target height estimation unit 245 adds the correction term $\Delta Ht = R_m \times \cos(\phi_{NSEL\_NLM})\tan(\psi)$ to $H_m$ given by Equation (21).

In contrast, in the case where the road surface slope angle $\psi$ is negative, if $H_p$ given by Equation (20) is used, the target height is estimated as a value lower than the actual value by $R_m \times \cos(\phi_{NSEL\_NLM})$ corresponding to the road surface slope. Therefore, in Equation (22), a correction is performed such that the correction term $\Delta Ht$ is added to $H_p$ given by Equation (20). In addition, in the case where the road surface slope angle $\psi$ is negative, if $H_m$ given by Equation (21) is used, the target height is estimated as a value greater than the actual value by $R_m \times \cos(\phi_{NSEL\_NLM})$ corresponding to the road surface slope. Therefore, in Equation (23), a correction is performed such that the correction term $\Delta Ht$ is subtracted from $H_m$ given by Equation (21).

Even when the radar apparatus 10 is mounted in a vehicle (not illustrated), the target height estimation performed by the radar apparatus 10 is not effected by road surface slope by mounting the radar apparatus 10 such that the road surface slope angle $\psi$ and the radar axis are parallel to each other. In addition, when the radar apparatus 10 is attached to the front of the vehicle, the road surface slope angle and the radar axis can be parallel to each other by using one of the following techniques:

(1) When the radar apparatus 10 is mounted in the vehicle, the radar apparatus 10 is mounted such that the radar axis coincides with the depression angle of 0 degrees, and (2) Since the road surface slope angle $\psi$ can be made to coincide with the radar axis by performing correction such that the depression angle direction estimation value corresponds to a depression angle of 0 degrees with respect to the depression angle 0-degree direction, the road surface slope angle $\psi$ can be made to correspond to the radar axis.

Thus, the radar apparatus 10 can measure the target height without being effected by the road surface slope.

As described above, according to Modification 1, if the radar axis of the virtual receiving array in the vertical direction (the normal direction of the antenna surface arranged in the vertical direction, that is, the direction perpendicular to the vertical direction) and the road surface extending between the radar apparatus 10 and the target are not parallel to each other, the radar apparatus 10 corrects the position of the target (the target height) on the basis of the road surface slope angle. Thus, the radar apparatus 10 can accurately estimate the target height even at a place where a road surface slope angle exists.

Modification 2 of Embodiment

According to the above-described embodiment, the evaluation function based on the principle of maximum likelihood estimation is applied as the evaluation function used by the direction estimation evaluation function calculation unit 242 and the angle spread detection unit 244. However, the evaluation function used by the direction estimation evaluation function calculation unit 242 and the angle spread detection unit 244 is not limited to the evaluation function based on the principle of maximum likelihood estimation. For example, a direction estimation evaluation function based on the Capon method or the MUSIC (Multiple Signal Classification) method may be applied.

According to Modification 2, as an example, a description is given of a case in which the direction estimation evaluation function calculation unit 242 applies an evaluation function based on the Capon method and the angle spread detection unit 244 applies an angle spread estimation method using the Capon method. The operations that differ from those of the above embodiment are mainly described below. Note that the angle spread estimation method using the Capon method is described in Japanese Unexamined Patent Application Publication No. 2002-368663.

The direction estimation evaluation function calculation unit 242 performs direction estimation at predetermined angular intervals $\Delta\phi$ by using an evaluation function based on the Capon method. An evaluation function based on the Capon method is described in, for example, J. Capon, "High-Resolution Frequency-Wavenumber Spectrum Analysis." Proc. IEEE, 57 (8), pp. 1408-1418, 1969. The function is expressed by the following equations:

$$E_V(\phi) = \frac{a^H(\alpha_{SV}, \phi)a(\alpha_{SV}, \phi)}{a^H(\alpha_{SV}, \phi)R^{-1}a(\alpha_{SV}, \phi)}, \quad (24)$$

and $$R = \sum_{NK_r = -\Delta_r}^{\Delta_r} \sum_{ND_f = -\Delta_f}^{\Delta_f} h(k + NK_r, f_s + ND_f, w) \quad (25)$$

$$h^H(k + NK_r, f_s + ND_f, w).$$

Herein, R is an antenna received signal correlation matrix generated by using the virtual receiving array correlation vector $h\_{after\_cal}(k, fs, w)$, a predetermined distance range $\Delta_r$ close to the virtual receiving array correlation vector $h\_{after\_cal}(k, fs, w)$, and a virtual receiving array correlation vector in a predetermined Doppler range $\Delta_f$. In addition, $R^{-1}$ is the inverse of the matrix R.

The direction estimation evaluation function calculation unit 242 changes the angle $\phi$ at predetermined vertical (depression angle) intervals $\beta_2$ within the range of the vertical (or depression) direction in which the direction of arrival is estimated. For example, the direction estimation evaluation function calculation unit 242 variably sets $\phi$ as follows:

$\phi v = \phi \min + (v-1)\beta_2$, where $v=1, \ldots, NV$, and $NV=\text{floor}[(\phi\max - \phi\min)/\beta_2] + 1$.

The direction estimation evaluation function calculation unit 242 outputs the evaluation functions $E^V(\phi^{(1)}, \phi^{(2)}, \ldots, \phi^{(NW)})$ which are the evaluation result for the number NV of vertical direction search grids. Accordingly, the direction estimation evaluation function calculation unit 242 outputs the evaluation values of NV evaluation functions.

The maximum likelihood value extraction unit 243 extracts the maximal value on the basis of the output of the direction estimation evaluation function calculation unit 242. That is, from the angle spectrum obtained from the evaluation results of the evaluation functions, the maximum likelihood value extraction unit 243 extracts a predetermined number NW of peaks from a peak with a large maximal value peak or NW peaks within a predetermined level from the maximum peak level and defines the angular directions of the peak directions as $\phi^{(1)}, \ldots,$ and $\phi^{(NW)}$.

For the angle spreads in the angular directions $\phi^{(1)}, \ldots,$ and $\phi^{(NW)}$ extracted by the maximum likelihood value extraction unit 243, the angle spread detection unit 244 evaluates an angle spread parameter $\delta$ at each predetermined angular step $\Delta\delta$ by using the following angle spread evaluation function:

$$AS_C(\phi_{NSEL\_NLM}, \delta) = \qquad (26)$$

$$\frac{a^H(\alpha_{SV}, \phi_{NSEL\_NLM} - j\delta)a(\alpha_{SV}, \phi_{NSEL\_NLM} + j\delta)}{a^H(\alpha_{SV}, \phi_{NSEL\_NLM} - j\delta)R^{-1}a(\alpha_{SV}, \phi_{NSEL\_NLM} + j\delta)}.$$

Note that in Equation (26), the inverse matrix $R^{-1}$ of the antenna received signal correlation matrix R is used which is calculated by the direction estimation evaluation function calculation unit 242.

Also, note that $a(\alpha_{SV}, \phi_{NSEL\_NLM}+j\delta)$ is a generalized array direction vector obtained by extending the direction vector $a(\theta_u, \phi_v)$ of the virtual receiving array such that the direction vector $a(\theta_u, \phi_v)$ has an argument in the complex domain. The angle spread values $\delta^{(1)}, \ldots,$ and $\delta^{(NW)}$ that provide the maximum peaks to the angle spread spectrum obtained by varying the angle spread parameters δ for the angle directions $\phi^{(1)}, \ldots,$ and $\phi^{(NW)}$ are determined as the estimated values, respectively.

Subsequently, the angle spread detection unit 244 calculates the angular spread angles $AS_{minus}(\phi_{NSEL\_NLM})$ and $AS_{plus}(\phi_{NSEL\_NLM})$ around the depression angle direction $\phi_{NSEL\_NLM}$ for the incoming wave incident in the depression angle direction $\phi_{NSEL\_NLM}$ by using the following equation:

$$AS_{minus}(\phi_{NSEL\_NLM}) = AS_{plus}(\phi_{NSEL\_NLM}) = 0.5 \times \alpha_{AS} \times \delta \qquad (27),$$

where NSEL_NLM=1, . . . , NW, and $\alpha_{AS}$ is a predetermined constant.

Note that according to Modification 2, the direction estimation evaluation function calculation unit 242 uses the Capon method, and the angle spread detection unit 244 estimates the angle spread by applying the generalized array mode vector on the basis of the direction estimation evaluation function based on the Capon method. However, the applied method is not limited to the Capon method. The angle spread detection unit 244 can estimate the angle spread by applying the generalized array mode vector in the MUSIC method or the ESPRIT (Estimation of Signal Parameter via Rotational Invariance Techniques) method in the same manner. That is, the direction estimation evaluation function calculation unit 242 may use, for example, the MUSIC method or the ESPRIT method, and the angle spread detection unit 244 may estimate the angle spread by applying the generalized array mode vector on the basis of the direction estimation evaluation function based on the MUSIC method or the ESPRIT method.

Since the operation performed by the target height estimation unit 245 according to Modification 2 is the same as that according to the above-described embodiment, description of the operation is not repeated.

As described above, according to Modification 2, the direction estimation evaluation function calculation unit 242 uses, for example, the Capon method, the MUSIC method, or the ESPRIT method, and the angle spread detection unit 244 estimates the angle spread by applying a generalized array mode vector on the basis of a direction estimation evaluation function based on the Capon method, the MUSIC method, or the ESPRIT method. Thus, like the above-described embodiment, according to Modification 2, the radar apparatus 10 can accurately estimate the target height. In addition, according to Modification 2, the amount of calculation can be reduced, as compared with the calculation based on the maximum likelihood estimation method described in the above embodiment.

Modification 3 of Embodiment

The above embodiment has been described with reference to estimation of the angle spread in the depression angle direction by arranging a plurality of antennas in the vertical direction. In contrast, according to Modification 3, a description is given with reference to the case of estimating the angle spread in the azimuth direction by arranging a plurality of antennas in the horizontal direction.

Figure 15:
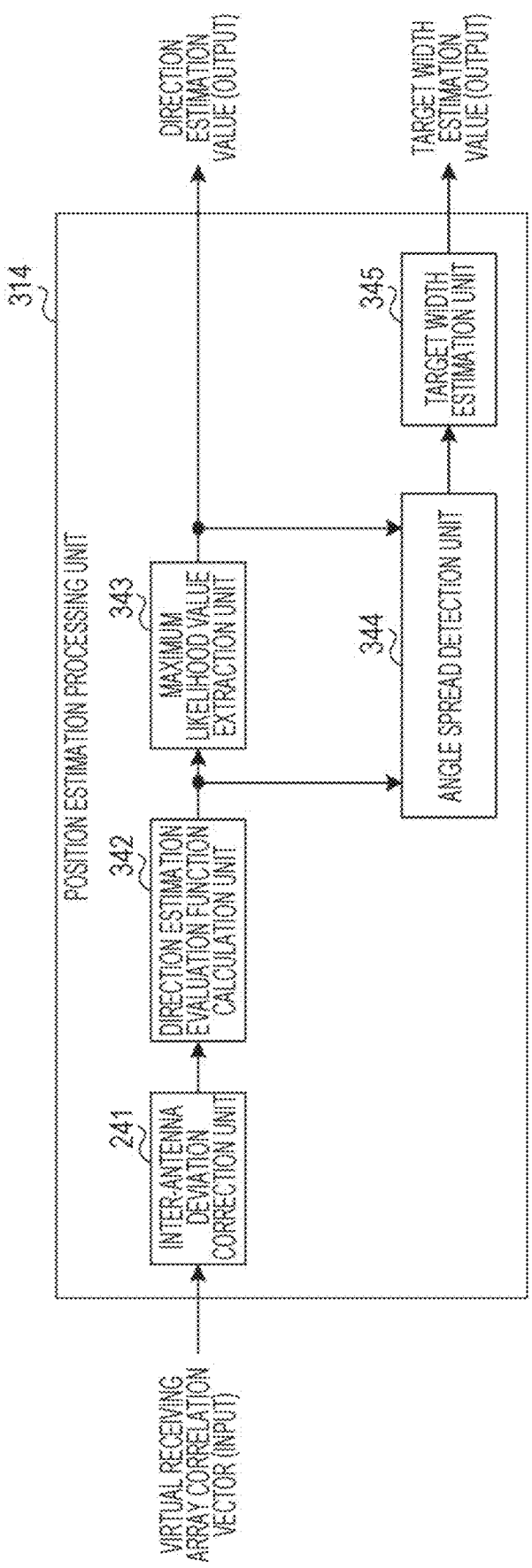
FIG. 15 is a block diagram of the internal configuration of a position estimation processing unit according to modification 3.

A radar apparatus 10 (FIG. 4) according to Modification 3 includes a position estimation processing unit 314 illustrated in FIG. 15 instead of the position estimation processing unit 214 (FIG. 8). The position estimation processing unit 314 estimates the position of a target in the horizontal direction (hereinafter referred to as a "target width") instead of the target height.

The same reference numerals are used in FIG. 15 to describe those components of the position estimation processing unit 314 that are identical to the components of the position estimation processing unit 214 illustrated in FIG. 8, and description of the components is not repeated.

Operation Performed by Direction Estimation Evaluation Function Calculation Unit A direction estimation evaluation function calculation unit 342 performs an operation in which "vertical" is read as "horizontal" and "horizontal" is read as "vertical" in the description of the direction estimation evaluation function calculation unit 242 according to the above-described embodiment.

That is, the direction estimation evaluation function calculation unit 342 calculates an evaluation function to estimate the direction in the horizontal direction in a predetermined angular range at predetermined angular intervals by using the virtual receiving array correlation vector $h_{\_after\_cal}$ (k, fs, w) having corrected inter-antenna deviation and input from the inter-antenna deviation correction unit 241.

As an example of the evaluation function, application of an evaluation function based on the principle of maximum likelihood estimation is described below.

More specifically, the direction estimation evaluation function calculation unit 342 extracts, from the elements each corresponding to one of the virtual receiving antennas VA #1, . . . , and VA #(Nt×Na) included in the virtual receiving array correlation vector $h_{\_after\_cal}$(k, fs, w) having corrected inter-antenna deviation, a horizontal direction array correlation vector $h_{SubH}$(k, fs, w) composed of elements of a virtual horizontal direction linear array that form, in the horizontal direction, a linear array of three or more antennas in the virtual receiving array.

Subsequently, the direction estimation evaluation function calculation unit 342 performs a maximum likelihood estimation process in the horizontal direction by using the horizontal direction array correlation vector $h_{SubH}$(k, fs, w) composed of extracted elements of the virtual horizontal direction linear array. In the maximum likelihood estimation in the horizontal direction, the direction estimation evaluation function calculation unit 342 calculates the angles $\theta^{(1)}, \theta^{(2)}, \ldots,$ and $\theta^{(NW)}$ in the horizontal direction (hereinafter also referred to as "azimuth angles") that make the evaluation function $E_H(\theta^{(1)}, \theta^{(2)}, \ldots, \theta^{(NW)})$ based on the principle of maximum likelihood estimation minimum or maximum. Herein, NW (an integer greater than or equal to 1) represents the number of incoming waves. The minimum or maximum value of the evaluation function $E_V(\theta^{(1)}, \theta^{(2)}, \ldots, \theta^{(NW)})$ (described in more detail below) is the "maximum likelihood value of the evaluation function". In addition, the NW angles $\theta^{(1)}, \theta^{(2)}, \ldots,$ and $\theta^{(NW)}$ in the horizontal direction corresponding to the maximum likelihood value of the evaluation function are referred to as "maximum likelihood angles".

Note that the number NW of incoming waves may be a predetermined fixed number of waves or a number adaptively varied by using the virtual receiving array correlation vector $h\_after\_cal(k, f_s, w)$. To estimate the number of incoming waves, MDL or AIC, for example, may be used.

In addition, the number of antennas constituting the virtual horizontal direction linear array in the virtual receiving array is not limited to three, and the virtual horizontal direction linear array can be composed of at least (NW+1) virtual receiving antennas in accordance with the number NW of incoming waves.

When there are a plurality of virtual horizontal direction linear arrays which constitute a linear array of three or more antennas in the horizontal direction on the virtual receiving array, the direction estimation evaluation function calculation unit 342 extracts a plurality of horizontal direction array correlation vectors $\{h_{SubV(1)}(k, f_s, w), h_{SubH(2)}(k, f_s, w), h_{SubV(NsubH)}(k, f_s, w)\}$ each composed of the elements included in one of the virtual horizontal direction linear arrays and calculates the evaluation function $E_H(\theta^{(1)}, \theta^{(2)}, \ldots, \theta^{(NW)})$, where "$N_{subH}$" represents the number of virtual horizontal direction linear arrays of three or more antennas in the horizontal direction (the number of horizontal direction array correlation vectors).

For example, as the predetermined evaluation function $E_H(\theta^{(1)}, \theta^{(2)}, \ldots, \theta^{(NW)})$ based on the principle of maximum likelihood estimation, the following equations can be used:

$$E_H(\theta^{(1)}, \ldots, \theta^{(NW)}) = \sum_{ns=1}^{N_{subH}} \|h_{SubH(ns)}(k, f_S, w) - A_{SubH(ns)}S_{SubH(ns)}\|^2, \quad (28)$$

$$A_{SubH(ns)} = [a_{SubH(ns)}(\theta^{(1)}, \alpha_{SH}), \ldots, a_{SubH(ns)}(\theta^{(NW)}, \alpha_{SH})], \quad (29)$$

and $$S_{SubH(ns)} = (A_{SubH(ns)}^H A_{SubH(ns)})^{-1} A_{SubH(ns)}^H h_{SubH(ns)}(k, f_S, w). \quad (30)$$

Herein, $a_{SubH}(\theta_u, \alpha_{SH})$ represents a horizontal direction array direction vector and is a direction vector obtained by extracting, from the direction vector $a(\theta_u, \phi_v)$ of the virtual receiving array, the entries corresponding to the elements of the virtual horizontal direction linear array among the elements VA #1, ..., VA #(Nt×Na) included in the virtual receiving array correlation vector $h\_after\_cal(k, f_s, w)$. Note that $\alpha_{SH}$ is a fixed direction and may be, for example, the 0° direction or any other direction.

In addition, the direction vector $a(\theta_u, \phi_v)$ is a (Nt×Na)-dimensional column vector of elements which are the complex responses of the virtual receiving array antenna when the radar reflection wave arrives from the azimuth direction $\theta$ and the depression angle direction $\phi$. The complex response $a(\theta_u, \phi_v)$ of the virtual receiving array antenna represents the phase difference calculated by the element interval between the antennas in a geometric optics manner.

That is, the complex response $a(\theta_u, \phi_v)$ of the virtual receiving array antenna is a value uniquely calculated if the arrangement of the virtual receiving array in the radar apparatus 10 is determined. Therefore, the direction estimation evaluation function calculation unit 342 may calculate and store the direction vector $a(\theta_u, \phi_v)$ in advance on the basis of the virtual receiving array arrangement VA #1, ..., VA #(Nt×Na).

Alternatively, the direction estimation evaluation function calculation unit 342 may store, as the direction vector $a(\theta_u, \phi_v)$, the value obtained by measuring the complex response of the virtual receiving array antenna when the radar reflection wave arrives in the azimuth direction $\theta$ and the depression angle direction $\phi$. In this case, since the direction vector $a(\theta_u, \phi_v)$ also includes a deviation depending on the direction between the array antennas, the position estimation processing unit 314 can correct the deviation from the phase calculated ideally in a geometric optics manner at the same time. Thus, more accurate angle measurement processing can be performed.

Herein, $\theta_u$ is a vector that is changed at predetermined horizontal (or azimuth) angular increments of $\beta_1$ in the horizontal (or azimuth) range in which the direction-of-arrival estimation is performed. For example, $\theta_u$ is set as follows:

$\theta_u = \theta\min + u\beta_1$, $u=1, \ldots, NU$, and $NU = \text{floor}[(\theta\max - \theta\min)/\beta_1] + 1$, where floor(x) is a function that returns the maximum integer value not exceeding the real number x.

Furthermore, $\phi_v$ is a vector that is changed in the vertical (or depression angle) range in which the direction-of-arrival estimation is performed at a predetermined vertical (or depression angle) interval $\beta_2$. For example, $\phi_v$ is set as follows:

$\phi_v = \phi\min + v\beta_2$, $v=1, \ldots, NV$, and $NV = \text{floor}[(\phi\max - \phi\min)/\beta_2] + 1$.

The angle in the case of sampling within a predetermined azimuth angle range (the range of the minimum azimuth angle $\theta\min$ to the maximum azimuth angle $\theta\max$) at angular increments of $\beta_1$ is referred to as "horizontal direction search grid". In addition, the number NU of horizontal direction search grids is referred to as a "horizontal direction search grid number".

The number of combinations of incoming wave angles equal in number to the number NW of incoming waves taken from the horizontal direction search grid number NU is $_{NU}C_{NW}$. The direction estimation evaluation function calculation unit 342 calculates the evaluation function $E_H(\theta^{(1)}, \theta^{(2)}, \ldots, \theta^{(NW)})$ for each of the $_{NU}C_{NW}$ combinations of angles $\theta$.

The direction estimation evaluation function calculation unit 342 outputs the NW azimuth angles $(\theta^{(1)}, \theta^{(2)}, \ldots, \theta^{(NW)})$ used for evaluation of the combination of the angles $\theta$ by the evaluation function, the evaluation value $E_H(\theta^{(1)}, \theta^{(2)}, \ldots, \theta^{(NW)})$ and the power estimation values of the NW incoming waves in the NW azimuth angle directions.

The direction estimation evaluation function calculation unit 342 calculates the power estimation value as described below.

$S_{SubH}$ given by Equation (30) is composed of a column vector having NW elements, and each of the elements represents a complex amplitude component estimation value of one of the azimuth angles $\theta^{(1)}, \theta^{(2)}, \ldots,$ and $\theta^{(NW)}$ being evaluated. Therefore, the direction estimation evaluation function calculation unit 342 squares the absolute value of each of the elements of $S_{SubH}$ given by Equation (30). In this manner, the direction estimation evaluation function calculation unit 342 calculates the power estimation values $P_w(\theta^{((1)})$, $P_w(\theta^{((2)})$, ..., and $P_w(\theta^{((NW)})$ of the incoming waves at the azimuth angles $\theta^{(1)}, \theta^{(2)}, \ldots,$ and $\theta^{(NW)}$ being evaluated, respectively.

Alternatively, when the number $N_{SubH}$ of the horizontal direction array correlation vectors is 2 or greater, the direction estimation evaluation function calculation unit 342 may calculate the power estimation value for each of $S_{SubH(1)}$, $S_{SubH(2)}$, ..., and $S_{SubH(NsuvV)}$. Thereafter, the direction estimation evaluation function calculation unit 342 may define the average value of the calculated power estimation values as the power estimation value.

As another example of the evaluation function $E_H(\theta^{(1)}, \theta^{(2)}, \ldots, \theta^{(NW)})$ based on the principle of maximum likelihood estimation, the following equation (31) may be used:

$$E_H(\theta^{(1)}, \ldots, \theta^{(NW)}) = \sum_{ns=1}^{N_{subH}} \|A_{SubH(ns)} S_{SubH(ns)}\|^2. \quad (31)$$

According to Equation (31), the angles that maximize the evaluation function $E_H(\theta^{(1)}, \theta^{(2)}, \ldots, \theta^{(NW)})$ are the maximum likelihood values (the maximum likelihood angles).

In addition, among the parameters used for the evaluation function given by Equation (28) or Equation (31), the parameter $(A_{SubH(ns)}^H A_{SubH(ns)})^{-1} A_{SubH(ns)}^H$, which relates to the direction vector $a(\theta_u, \phi_v)$ and is included in Equation (30), is a value determined depending on the virtual receiving array arrangement and is a fixed value for each of the combinations of angles of $\theta^{(1)}, \theta^{(2)}, \ldots,$ and $\theta^{(NW)}$. The direction estimation evaluation function calculation unit 342 may calculate $(A_{SubH(ns)}^H A_{SubH(ns)})^{-1} A_{SubH(ns)}^H$ for each of the combinations of the angles of $\theta^{(1)}, \theta^{(2)}, \ldots,$ and $\theta^{(NW)}$ in the horizontal direction. Alternatively, the direction estimation evaluation function calculation unit 342 may calculate $(A_{SubH(ns)}^H A_{SubH(ns)})^{-1} A_{SubH(ns)}^H$ for each of the combinations of the angles of $\theta^{(1)}, \theta^{(2)}, \ldots,$ and $\theta^{(NW)}$ and store the results of calculation in the form of a table in advance. Subsequently, the direction estimation evaluation function calculation unit 342 may read $(A_{SubH(ns)}^H A_{SubH(ns)})^{-1} A_{SubH(ns)}^H$ for each of the angles. As a result, although a memory circuit for storing $(A_{SubH(ns)}^H A_{SubH(ns)})^{-1} A_{SubH(ns)}^H$ is required, the need for an arithmetic circuit, such as a multiplier or an adder, can be eliminated.

Alternatively, the direction estimation evaluation function calculation unit 342 may calculate $(A_{SubH(ns)}^H A_{SubH(ns)})^{-1}$ for each of the combinations of the angles of $\theta^{(1)}, \theta^{(2)}, \ldots, \theta^{(NW)}$ and store the results of calculation in the form of a table in advance. Subsequently, the direction estimation evaluation function calculation unit 342 may read $(A_{SubH(ns)}^H A_{SubH(ns)})^{-1}$ for each of the angles. As a result, although a memory circuit for storing $(A_{SubH(ns)}^H A_{SubH(ns)})^{-1}$ is required, the need for an arithmetic circuit, such as a multiplier or an adder, for calculating the inverse matrix can be eliminated.

As an example, the operation performed by the direction estimation evaluation function calculation unit 342 for the example of arrangement of the transmitting antenna 106 and the receiving antenna 202 illustrated in FIGS. 9A and 9B is described below.

In FIG. 9A, the transmitting array antenna has three antennas arranged at equal intervals ($d_V$) in the vertical direction, and the receiving array antenna has three antennas arranged at equal intervals ($d_H$) in the horizontal direction. As a result, as illustrated in FIG. 9B, a virtual receiving array arrangement is obtained that consists of nine antennas arranged in a rectangular shape with three antennas in the horizontal direction and three antennas in the vertical direction. In the virtual receiving array illustrated in FIG. 9B, the aperture lengths $D_H$ and $D_V$ in the horizontal and vertical directions of the antenna are $2d_H$ and $2d_V$, respectively. That is, $D_H=2d_H$, and $D_V=2d_V$.

As illustrated in FIG. 9B, the virtual receiving array has three virtual horizontal direction linear arrays each composed of three antennas in the horizontal direction (that is, $N_{subH}=3$). Thus, virtual horizontal direction linear array correlation vectors $\{h_{SubH(1)}(k, fs, w), h_{SubH(2)}(k, fs, w), h_{SubH(3)}(k, fs, w)\}$ each corresponding to one of the virtual horizontal direction linear arrays are obtained. More specifically, in FIG. 9B, the element numbers of the virtual array correlation vectors $h\_after\_cal(k, fs, w)$ included in the horizontal direction array correlation vector $\{h_{SubH(1)}(k, fs, w), h_{SubH(2)}(k, fs, w), h_{SubH(3)}(k, fs, w)\}$ are $\{VA\ \#1, VA\ \#4, VA\ \#7\}$, $\{VA\ \#2, VA\ \#5, VA\ \#8\}$, and $\{VA\ \#3, VA\ \#6, VA\ \#9\}$, respectively.

The horizontal direction array direction vectors $\{a_{SubH(1)}(\theta_u, \alpha_{SH}), a_{SubH(2)}(\theta_u, \alpha_{SH}), a_{SubH(3)}(\theta_u, \alpha_{SH})\}$ corresponding to the horizontal direction array correlation vectors $\{h_{SubH(1)}(k, fs, w), h_{SubH(2)}(k, fs, w), h_{SubH(3)}(k, fs, w)\}$ are column vectors generated by extracting the element numbers $\{VA\ \#1, VA\ \#4, VA\ \#7\}$, $\{VA\ \#2, VA\ \#5, VA\ \#8\}$, and $\{VA\ \#3, VA\ \#6, VA\ \#9\}$ of the direction vector $a(\theta_u, \phi_v)$ of the virtual receiving array, respectively.

The direction estimation evaluation function calculation unit 342 calculates the evaluation function $E_H$ (for example, Equation (28) or Equation (31)) by using the horizontal direction array correlation vectors $\{h_{SubH(1)}(k, fs, w), h_{SubH(2)}(k, fs, w), h_{SubH(3)}(k, fs, w)\}$.

Operation Performed by Maximum Likelihood Value Extraction Unit

The maximum likelihood value extraction unit 343 extracts the angle of arrival in the horizontal direction (the azimuth angle) of the reflected wave signal by using the reflected wave signal of the virtual horizontal direction linear array composed of the receiving antennas arranged linearly in the horizontal direction among the plurality of receiving antennas constituting the virtual receiving array.

More specifically, the maximum likelihood value extraction unit 343 extracts a combination of angles that provide the maximum likelihood value of the evaluation function $E_H(\theta^{(1)}, \theta^{(2)}, \ldots, \theta^{(NW)})$ (the angles at which the evaluation function $E_H$ becomes minimum or maximum) on the basis of the output of the direction estimation evaluation function calculation unit 342. Thereafter, the maximum likelihood value extraction unit 343 outputs, as the direction estimation value of the angle of arrival (the azimuth angle), the maximum likelihood value $E_{HML}$ of the evaluation function $E_H(\theta^{(1)}, \theta^{(2)}, \ldots, \theta^{(NW)})$ and the combination of azimuth angles $\theta_{ML}^{(1)}, \theta_{ML}^{(2)}, \ldots,$ and $\theta_{ML}^{(NW)}$ that provide the maximum likelihood value. Note that the maximum likelihood value $E_{HML}$ satisfies the following equation:

$$E_{HML}=E_H(\theta_{ML}^{(1)}, \theta_{ML}^{(2)}, \ldots, \theta_{ML}^{(NW)}) \quad (32).$$

That is, the maximum likelihood value extraction unit 343 extracts, as the angle of arrival (the direction of arrival) of the reflected wave signal from the target in the horizontal direction, NW maximum likelihood angles $\theta_{ML}^{(1)}, \theta_{ML}^{(2)}, \ldots,$ and $\theta_{ML}^{(NW)}$ corresponding to the maximum likelihood value $E_{HML}$ calculated by the direction estimation evaluation function calculation unit 342 through the maximum likelihood estimation process for the horizontal direction.

In addition, the maximum likelihood value extraction unit 343 outputs, to an angle spread detection unit 344, the maximum likelihood value $E_{HML}$, the combination of azimuth angles (the maximum likelihood angles) $\theta_{ML}^{(1)}$, $\theta_{ML}^{(2)}, \ldots, \theta_{ML}^{(NW)}$ that provide the maximum likelihood value, and the power estimation values $P_w(\theta_{ML}^{(1)})$, $P_w(\theta_{ML}^{(2)}), \ldots,$ and $P_w(\theta_{ML}^{(NW)})$ of the NW incoming waves incident in NW azimuth angle directions.

Operation Performed by Angle Spread Detection Unit

The angle spread detection unit 344 uses the reflected wave signal of the virtual horizontal direction linear array composed of the receiving antennas arranged linearly in the horizontal direction among the plurality of receiving antennas constituting the virtual receiving array to detect the angle spread of the reflected wave signal in the horizontal direction around the angle of arrival of the reflected wave signal (that is, the maximum likelihood angle).

The angle spread detection unit 344 detects the angle spread of the incoming wave on the basis of the output of the direction estimation evaluation function calculation unit 342 and the output of the maximum likelihood value extraction unit 343. The processing performed by the angle spread detection unit 344 is described in detail below.

The angle spread detection unit 344 extracts the combination of azimuth angles that makes the evaluation function $E_H(\theta^{(1)}, \theta^{(2)}, \ldots, \theta^{(NW)})$ equal to a local maximum likelihood value (the extremum) on the basis of the evaluation functions $E_H(\theta^{(1)}, \theta^{(2)}, \ldots, \theta^{(NW)})$ obtained by changing the NW azimuth angles $(\theta^{(1)}, \theta^{(2)}, \ldots, \theta^{(NW)})$ in the horizontal direction search grids among the outputs of the direction estimation evaluation function calculation unit 342.

In addition, the angle spread detection unit 344 uses the output of the maximum likelihood value extraction unit 343 (e.g., the maximum likelihood value $E_{HML}$) to extract the combination of azimuth angles that provides the local maximum likelihood value (the extremum) satisfying the conditions 1) and 2) described below. Hereinafter, the angles corresponding to the local maximum likelihood value (the extremum) extracted on the basis of the output of the maximum likelihood value extraction unit 343 are referred to as "extremum angles". At least the combination of azimuth angles $(\theta_{ML}^{(1)}, \theta_{ML}^{(2)}, \ldots, \theta_{ML}^{(NW)})$ that makes the evaluation function equal to the maximum likelihood value $E_{HML}$ is included in the extremum angles. The angle spread detection unit 344 outputs extremum angles equal in number to the predetermined number $N_{HLimit}$ or lower.

1) The case where the minimum value of a predetermined evaluation function based on the principle of maximum likelihood estimation is the maximum likelihood value (the case where the evaluation function given by Equation (28) is used)

The angle spread detection unit 344 extracts, as extremum angles, angles $[\theta_{NLM}^{(1)}, \theta_{NLM}^{(2)}, \ldots, \theta_{NLM}^{(NW)}]$ corresponding to the local minimum value (the minimal value) $E_H(\theta^{(1)}, \theta^{(2)}, \ldots, \theta^{(NW)})$ that satisfies the following condition:

$$E_H(\theta^{(1)}, \theta^{(2)}, \ldots, \theta^{(NW)}) < \alpha_H \times E_{HML} \quad (33)$$

Note that NLM=1, ..., $N_{HLocalML}$.

Herein, $\alpha_H$ is a predetermined value ($\alpha_H > 1$).

If the number of the extremum angles that satisfy the condition defined by Expression (33) exceeds the predetermined number $N_{HLimit}$ ($N_{HLocalML} > N_{HLimit}$), the angle spread detection unit 344 may give priority to an angle with a smaller evaluation value and output $N_{HLimit}$ or fewer candidates.

2) The case where the maximum value of the predetermined evaluation function based on the principle of the maximum likelihood estimation is the maximum likelihood value (the case where the evaluation function expressed in Equation (31) is used]

The angle spread detection unit 344 extracts, as the extremum angles, the angles $[\theta_{NLM}^{(1)}, \theta_{NLM}^{(2)}, \ldots, \theta_{NLM}^{(NW)}]$ corresponding to the local maximum value (the maximum value) $E_H(\theta^{(1)}, \theta^{(2)}, \ldots, \theta^{(NW)})$ that satisfies the following condition:

$$E_H(\theta^{(1)}, \theta^{(2)}, \ldots, \theta^{(NW)}) > \alpha_H \times E_{HML} \quad (34).$$

Note that NLM=1, ..., $N_{HLocalML}$.

Herein, $\alpha_H$ is a predetermined value ($\alpha_H < 1$).

If the number of extremum angles that satisfy the condition defined by Expression (34) exceeds the predetermined number $N_{HLimit}$ ($N_{HLocalML} > N_{HLimit}$), the angle spread detection unit 344 may give priority to an angle with a larger evaluation value and output $N_{HLimit}$ or fewer candidates.

The angle spread detection unit 344 performs angle spread detection on the basis of the extremum angles $[\theta_{NLM}^{(1)}, \theta_{NLM}^{(2)}, \ldots, \theta_{NLM}^{(NW)}]$ that satisfy the above-described condition. Note that NLM≤$N_{HLimit}$.

The extremum angles $[\theta_{NLM}^{(1)}, \theta_{NLM}^{(2)}, \theta_{NLM}^{(NW)}]$ which become extremum values within a range of a predetermined size from the maximum likelihood value of the evaluation function (for example, a range that satisfies the condition defined by Equation (12) or (13)) can be considered to form a reflected wave group generated by the reflected wave scattering around the azimuth angle (the maximum likelihood angle) direction which is the maximum likelihood value. Accordingly, the angle spread detection unit 344 detects the spread angle of such a reflected wave group as "angle spread".

The angle spread detection process performed by the angle spread detection unit 344 is described in detail below.

Step (1)

The angle spread detection unit 344 extracts the largest one of the power estimation values $P_w(\theta_{ML}^{(1)})$, $P_w(\theta_{ML}^{(2)}), \ldots,$ and $P_w(\theta_{ML}^{(NW)})$ of the incoming waves in the NW azimuth angle directions that make the evaluation function equal to the maximum likelihood value $E_{HML}$. In addition, by using the extracted power estimation value, the angle spread detection unit 344 calculates a normalized power estimation value obtained by normalizing each of the power estimation values of the incoming waves in the NW azimuth angle directions. Thereafter, the angle spread detection unit 344 extracts an azimuth angle direction in which the normalized power estimation value is greater than or equal to a predetermined value (the azimuth angle direction is referred to as an azimuth angle estimation value "$\theta_{NSEL\_NLM}$").

Note that the angle spread detection unit 344 may extract, from among the power estimation values $P_w(\theta_{ML}^{(1)})$, $P_w(\theta_{ML}^{(2)}), \ldots,$ and $P_w(\theta_{ML}^{(NW)})$ of the incoming waves in the NW azimuth angle directions that make the evaluation function equal to the maximum likelihood value $E_{HML}$, one greater than or equal to a predetermined value (that is, the normalization process is not performed).

Step (2)

The angle spread detection unit 344 obtains the frequency distribution of NLM (≤$N_{HLimit}$) sets of the extremum angles $[\theta_{NLM}^{(1)}, \theta_{NLM}^{(2)}, \ldots, \theta_{NLM}^{(NW)}]$ with respect to the horizontal direction search grids.

Step (3)

The angle spread detection unit 344 detects, as "$N_{GRID\_ON\_minus}$" and "$N_{GRID\_ON\_plus}$", the numbers of continuous horizontal direction search grids including the azimuth angle direction $\theta_{NSEL\_NLM}$ extracted in step (1) and each having a frequency count of 1 or greater preceding and succeeding the azimuth angle direction $\theta_{NSEL\_NLM}$, respectively.

Subsequently, the angle spread detection unit 344 calculates an angular spread angle $AS_{minus}(\theta_{NSEL\_NLM})$ (degrees) on the negative side of the azimuth angle direction $\theta_{NSEL\_NLM}$ and an angular spread angle $AS_{plus}(\theta_{NSEL\_NLM})$ (degrees) on the positive side of the azimuth angle direction $\theta_{NSEL\_NLM}$ for the incoming wave incident in the azimuth angle direction $\theta_{NSEL\_NLM}$ by using, for example, the following equations:

$$AS_{minus}(\theta_{NSEL\_NLM}) = (N_{GRID\_ON\_minus} - 0.5) \times \beta_1 \quad (35), \text{and}$$

$$AS_{plus}(\theta_{NSEL\_NLM}) = (N_{GRID\_ON\_plus} - 0.5) \times \beta_1 \quad (36)$$

where $\beta_1$ is the angular interval of the horizontal direction search grid.

In this manner, the angle spread detection unit 344 extracts NW extremum angles corresponding to at least one extremum (local maximum likelihood) including the maximum likelihood value $E_{HML}$ of the evaluation function $E_H$ used for the maximum likelihood estimation process. Thereafter, the angle spread detection unit 344 calculates the angle spread ($AS_{minus}(\theta_{NSEL\_NLM})$, $AS_{plus}(\theta_{NSEL\_NLM})$) on the basis of the distribution of the extremum angle $\theta_{NLM}$ around the maximum likelihood angle $\theta_{NSEL\_NLM}$ in the horizontal direction.

Modification of Step (3)

As another method for the step (3), the angle spread detection unit 344 may estimate the angle spread by using the weighting according to the frequency count for each of the horizontal direction search grids.

More specifically, the angle spread detection unit 344 detects, as "$N_{GRID\_ON\_minus}$" and "$N_{GRID\_ON\_plus}$", the numbers of horizontal direction search grids including the azimuth angle direction $\theta_{NSEL\_NLM}$ and each having a frequency count of 1 or greater around (on the negative side and the positive side of) the azimuth angle direction $\theta_{NSEL\_NLM}$ extracted in step (1), respectively.

Note that the frequency in each of the horizontal direction search grids within the range of $N_{GRID\_ON\_minus}$ is denoted as $N_{hist\_minus}(ngrid_{minus})$, where $ngrid_{minus} = 1, \ldots, N_{GRID\_ON\_minus}$. Similarly, the frequency in each of the horizontal direction search grids within the range of $N_{GRID\_ON\_plus}$ is denoted as $N_{hist\_plus}(ngrid_{plus})$, where $ngrid_{plus} = 1, \ldots, N_{GRID\_ON\_plus}$.

Subsequently, the angle spread detection unit 344 calculates an angular spread angle $AS_{minus}(\theta_{NSEL\_NLM})$ (degrees) on the negative side of the azimuth angle direction $\theta_{NSEL\_NLM}$ and an angular spread angle $AS_{plus}(\theta_{NSEL\_NLM})$ (degrees) on the positive side of the azimuth angle direction $\theta_{NSEL\_NLM}$ for the incoming wave incident in the azimuth angle direction $\theta_{NSEL\_NLM}$ by using the following equations:

$$AS_{minus}(\theta_{NSEL\_NLM}) = \frac{1}{N_{sum\_minus}} \sum_{ngrid_{minus}=1}^{N_{GRID\_ON\_minus}} N_{hist\_minus}(ngrid_{minus}) \times \{(ngrid_{minus} - 0.5)\beta_1\}^2, \quad (37)$$

$$AS_{plus}(\theta_{NSEL\_NLM}) = \frac{1}{N_{sum\_plus}} \sum_{ngrid_{plus}=1}^{N_{GRID\_ON\_plus}} N_{hist\_plus}(ngrid_{plus}) \times \{(ngrid_{plus} - 0.5)\beta_1\}^2, \quad (38)$$

$$\frac{1}{N_{sum\_minus}} = \sum_{ngrid_{minus}=1}^{N_{GRID\_ON\_minus}} N_{hist\_minus}(ngrid_{minus}), \quad (39)$$

and $$\frac{1}{N_{sum\_plus}} = \sum_{ngrid_{plus}=1}^{N_{GRID\_ON\_plus}} N_{hist\_plus}(ngrid_{plus}), \quad (40)$$

where $\beta_1$ is the angular interval of the horizontal direction search grid.

That is, in Equation (37) and Equation (38), the angle spread detection unit 344 performs the weighting such that the calculated angle spread increases with increasing frequencies $N_{hist\_minus}(ngrid_{minus})$ and $N_{hist\_plus}(ngrid_{plus})$ for each of the horizontal direction search grids within the ranges of $N_{GRID\_ON\_minus}$ and $N_{GRID\_ON\_plus}$, respectively.

In step (3) or the modification of step (3), when the angular interval of the horizontal direction search grid is coarse, the frequency count for each of the horizontal direction search grids tends to be discontinuous. Therefore, the angle spread detection unit 344 may detect, as the angle spread, the angle range in which continuous Ngate horizontal direction search grids have non-zero frequency count. Note that Ngate>1.

Operation Performed by Target Width Estimation Unit

The target width estimation unit 345 estimates the target width on the basis of the output of the angle spread detection unit 344.

More specifically, the target width estimation unit 345 converts the arrival delay time detected using the received reflected wave signal into a distance. Thereafter, the target width estimation unit 345 estimates a target width West by using the azimuth estimation value (the azimuth angle direction $\theta_{NSEL\_NLM}$) detected by the angle spread detection unit 344, the angular spread angles $AS_{minus}(\theta_{NSEL\_NLM})$ and $AS_{plus}(\theta_{NSEL\_NLM})$ (degrees) around the azimuth angle direction $\theta_{NSEL\_NLM}$ of the incoming wave incident in the azimuth angle direction $\theta_{NSEL\_NLM}$, and a distance $R_m$ converted from an arrival delay time k of the detected incoming wave.

Figure 16:
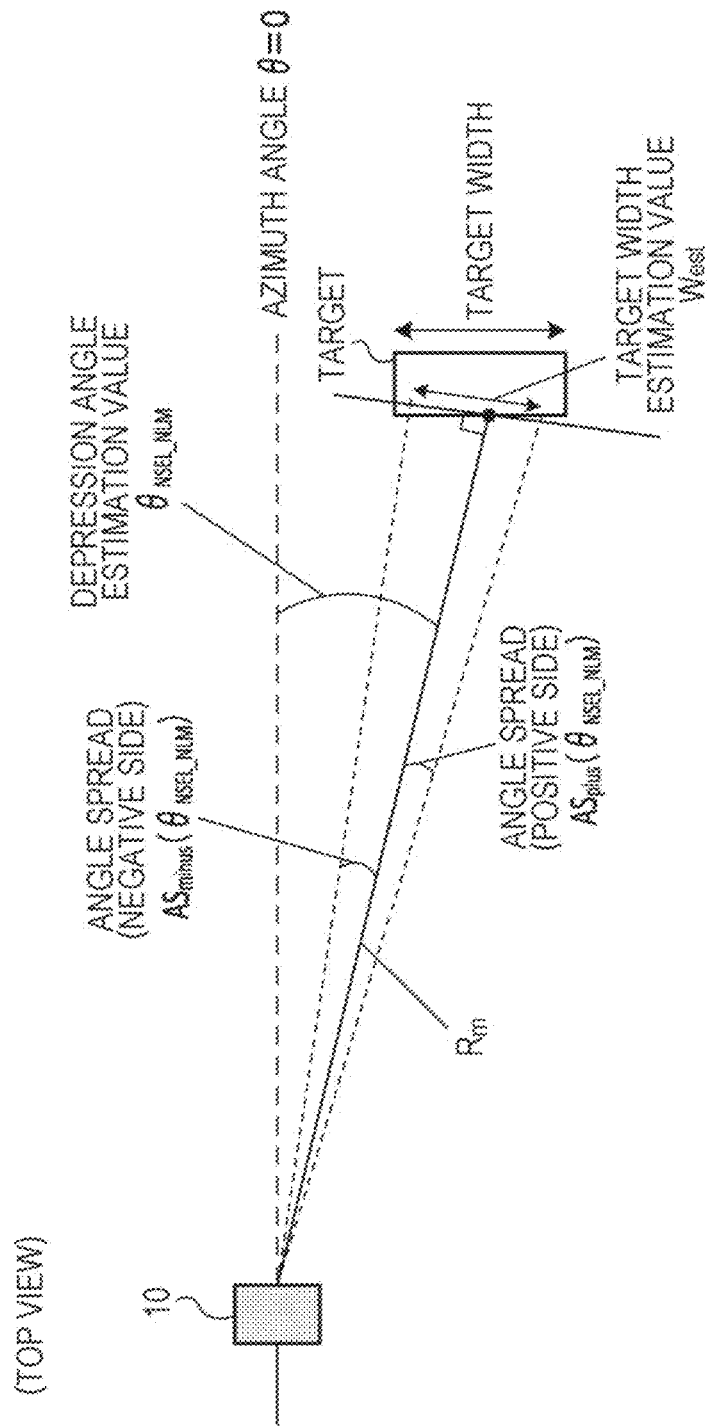
FIG. 16 illustrates an example of a target width estimation process according to modification 3.

The target width estimation process performed by the target width estimation unit 345 is described below with reference to FIG. 16.

The target width estimation unit 345 calculates the target width $West(R_m, \theta_{NSEL\_NLM})$ of the target located at a distance $R_m$ therefrom in the azimuth angle direction $\theta_{NSEL\_NLM}$ by using the angular spread angles $AS_{minus}(\theta_{NSEL\_NLM})$ and $AS_{plus}(\theta_{NSEL\_NLM})$ (degrees) around the azimuth angle direction $\theta_{NSEL\_NLM}$, as follows:

$$W_{est}(R_m, \theta_{NSEL\_NLM}) = R_m \tan(AS_{plus}(\theta_{NSEL\_NLM})) + R_m \tan(AS_{minus}(\theta_{NSEL\_NLM})) \quad (41).$$

Note that $AS_{minus}(\theta_{NSEL\_NLM}) > 0$, and $AS_{plus}(\theta_{NSEL\_NLM}) > 0$.

The operation performed by the position estimation processing unit 314 has been described above.

As described above, according to Modification 3, the position estimation processing unit 314 estimates the horizontal direction of the incoming wave and further estimates the angle spread on each of the positive side and the negative side of the azimuth angle direction of the incoming wave. Thereafter, the position estimation processing unit 314 estimates the target width by using the distance measurement result of the incoming wave in addition to these estimation results.

If, for example, the target is located close to a wall surface, the reflected wave signal received by the radar apparatus 10 in the horizontal direction includes a direct reflected wave which is the radar transmission wave directly reflected by the target in the radar direction and a "wall surface reflected wave" which is a wave reflected by the target in the direction toward the wall surface and is further reflected by the wall surface and, thereafter, travels in the radar direction. That is, the radar apparatus 10 receives a signal generated by combining a direct reflected wave and the wall surface reflected wave.

Even in this case, according to Modification 3, the position estimation processing unit 314 can estimate the target width in consideration of the wall surface reflected wave (that is, the angle spread) in addition to the direct reflected wave from the target.

Thus, even when the radar apparatus 10 receives a wall surface reflected wave which is an indirectly reflected wave from the target via the wall surface in addition to a direct reflected wave from the target, the radar apparatus 10 can improve the accuracy of estimation of the target width. Therefore, when, for example, the radar apparatus 10 is mounted in a vehicle or the like and collision determination is made, the radar apparatus 10 can accurately estimate the target width of a target located close to a wall surface and, thus, the collision determination can be correctly made.

In addition, like the above-described embodiment, the radar apparatus 10 calculates at least one extremum including the maximum likelihood value through the maximum likelihood value process for the horizontal direction by using the received reflected wave signal. Thereafter, the radar apparatus 10 estimates the angle spread around the maximum likelihood angle direction corresponding to the maximum likelihood value by using the calculated value. Consequently, for example, even when the vehicle having the radar apparatus 10 mounted therein is stopped or even when the target is located on the side of the vehicle, the radar apparatus 10 can accurately estimate the target width.

Note that the direction estimation evaluation function calculation unit 342 may use, for example, the Capon method, the MUSIC method, or the ESPRIT method, and the angle spread detection unit 344 may estimate the angle spread by applying a generalized array mode vector on the basis of the direction estimation evaluation function based on the Capon method, the MUSIC method, or the ESPRIT method. In this case, the amount of calculation can be reduced, as compared with the case of using the maximum likelihood estimation method.

Modification 4 of Embodiment

According to Modification 4, a method for classifying the size of the target is described.

Figure 17:
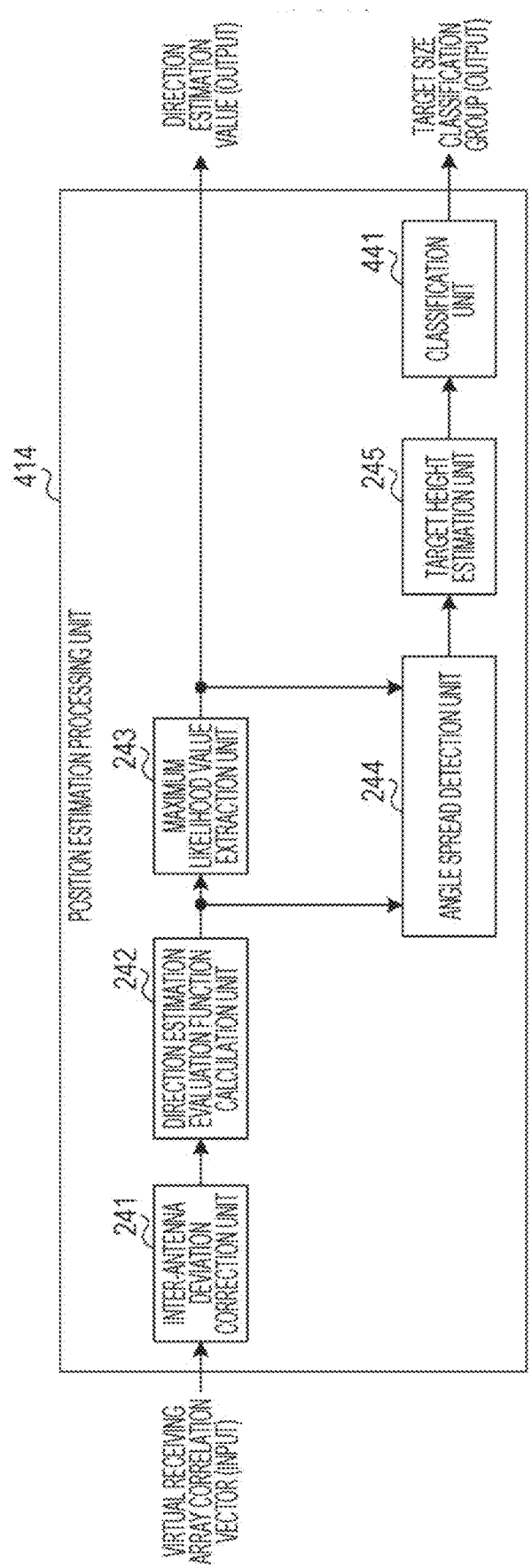
FIG. 17 is a block diagram of the internal configuration of a position estimation processing unit according to modification 4.

A radar apparatus 10 (FIG. 4) according to Modification 4 includes a position estimation processing unit 414 illustrated in FIG. 17 instead of the position estimation processing unit 214 (FIG. 8).

The same reference numerals are used in FIG. 17 to describe those components of the position estimation processing unit 414 that are identical to the constituent elements of the position estimation processing unit 214 illustrated in FIG. 8, and description of the components is not repeated. More specifically, the position estimation processing unit 414 includes a classification unit 441 in addition to the constituent elements of the position estimation processing unit 214.

The classification unit 441 classifies the size of the target on the basis of the target height $Hest(R_m, \phi_{NSEL\_NLM})$ of the target located at the distance $R_m$ therefrom in the depression angle direction $\phi_{NSEL\_NLM}$, which are input from the target height estimation unit 245. Thereafter, the classification unit 441 outputs the result of classification as target size classification information.

The target size classification information may be, for example, the target height $Hest(R_m, \phi_{NSEL\_NLM})$ for each distance $R_m$ or information indicating a predetermined size group (e.g., "large", "medium", or "small") into which the target height $Hest(R_m, \phi_{NSEL\_NLM})$ is classified.

Alternatively, the target size classification information may be information indicating a size group according to the necessity for a collision alert or collision avoidance (e.g., a size group requiring an alert or a size group not requiring an alert) into which the size of the target is classified when the radar apparatus 10 is mounted in a vehicle. For example, if the target height estimation value input from the target height estimation unit 245 is the height of a target which the vehicle can go over, the classification unit 441 classifies the size of the target into a size group not requiring an alert. However, if the target height estimation value is greater than or equal to the height that poses a danger when the vehicle goes over the target, the classification unit 441 classifies the size of the target into the size group requiring an alert.

Alternatively, the classification unit 441 may classify the size of the target by using the target vertical width estimation value in addition to the depression angle estimation value of the target. For example, if the depression angle estimation value is higher than the height of the vehicle and if the target vertical width estimation value is smaller than the width that causes the target to collide with the vehicle, the classification unit 441 may determine that the target is located at a height that allows the vehicle to go through (e.g., the target is a road traffic sign) and, thus, classify the size of the target into the size group not requiring an alert.

In this manner, the classification unit 441 classifies the target into one of different target size groups on the basis of the estimated position (target height) of the target. As a result, a system that performs collision determination in the vehicle having the radar apparatus 10 mounted therein can easily determine whether collision occurs (for example, whether alarm processing or collision avoidance processing is required) in accordance with the target size output from the radar apparatus 10.

Note that the classification unit 441 may perform the size classification of the target by using, for example, machine learning.

Furthermore, by arranging a plurality of antennas in the vertical direction and the horizontal direction in the radar apparatus 10, the angle spread with respect to the depression angle direction and the angle spread with respect to the azimuth direction can be simultaneously estimated. In addition, by estimating the target height (and/or the target vertical width) and the target width, the target size can be classified.

Figure 18:
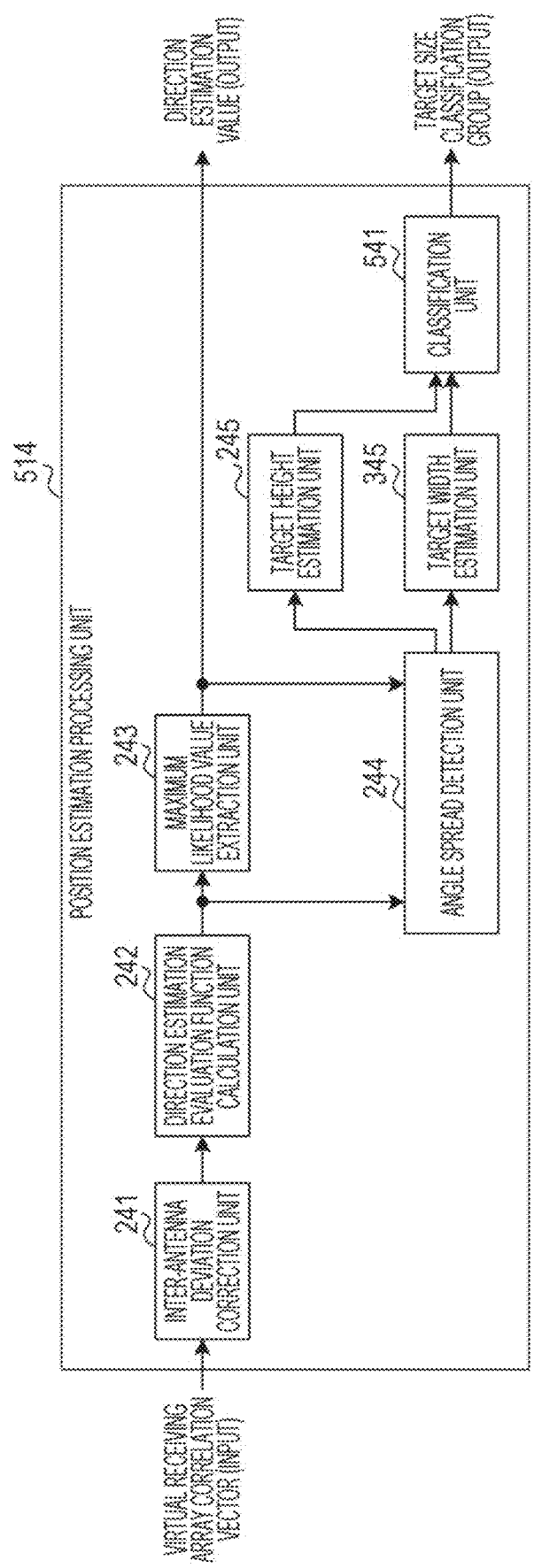
FIG. 18 is a block diagram of another internal configuration of the position estimation processing unit according to modification 4.

For example, the radar apparatus 10 according to Modification 4 may include a position estimation processing unit 514 illustrated in FIG. 18 instead of the position estimation processing unit 214 (FIG. 8).

The same reference numerals are used in FIG. 18 to describe those components of the position estimation processing unit 514 that are identical to the components of the position estimation processing unit 214 illustrated in FIG. 8, the position estimation processing unit 314 illustrated in FIG. 15, and the position estimation processing unit 414 illustrated in FIG. 17, and description of the components is not repeated. More specifically, in addition to the configuration of the position estimation processing unit 414, the position estimation processing unit 514 includes the target width estimation unit 345 illustrated in FIG. 15 and a classification unit 541.

The classification unit 541 classifies the size of the target on the basis of the output of the target height estimation unit 245 and the output of the target width estimation unit 345 and outputs the result of classification as the target size classification information. That is, the classification unit 541 combines the target height Eest($R_m$, $\phi_{NSEL\_NLM}$) of the target at the distance $R_m$ therefrom in the depression angle direction $\phi_{NSEL\_NLM}$ and the target width West($R_m$, $\theta_{NSEL\_NLM}$) of the target in the azimuth angle direction $\theta_{NSEL\_NLM}$ and classifies the size of the target.

The target size classification information may be, for example, the target height Hest($R_m$, $\phi_{NSEL\_NLM}$) and the target width West($R_m$, $\theta_{NSEL\_NLM}$) for each distance $R_m$. Alternatively, the target size classification information may be information indicating a predetermined size group (e.g., "large", "medium", or "small") into which the size of the target obtained from the target height Hest and the target width West is classified.

Alternatively, the target size classification information may be information indicating a size group according to the necessity for a collision alert or collision avoidance (e.g., a size group requiring an alert or a size group not requiring an alert) into which the size of the target is classified when the radar apparatus 10 is mounted in a vehicle. For example, if the target height estimation value input from the target height estimation unit 245 is the height of a target that the vehicle can go over, the classification unit 541 classifies the size of the target into the size group not requiring an alert. However, if the target height estimation value is greater than or equal to the height that poses a danger when the vehicle goes over the target, the classification unit 541 classifies the size of the target into the size group requiring an alert.

Alternatively, the classification unit 541 may classify the size of the target by using the target vertical width estimation value in addition to the depression angle estimation value of the target. For example, if the depression angle estimation value is higher than the height of the vehicle and if the target vertical width estimation value is smaller than the width that causes the target to collide with the vehicle, the classification unit 541 may determine that the target is located at a height that allows the vehicle to go through (e.g., the target is a road traffic sign) and, thus, classify the size of the target into the size group not requiring an alert.

Similarly, the classification unit 541 may classify the size of the target by using the azimuth angle estimation value of the target together with the target width estimation value. For example, if the vehicle is in danger of colliding with or moving too close to the target located in the travel direction in consideration of the target width, the classification unit 541 may classify the size of the target into the group requiring an alert.

Note that the classification unit 541 may perform the size classification of the target by using, for example, machine learning.

The embodiment according to an aspect of the present disclosure has been described above.

It should be noted that the operation according to the above-described embodiment and the operation according to each of the above-described modifications may be combined as appropriate.

Other Embodiments (1) The number Nt of transmitting antennas is not limited to three elements illustrated in FIG. 9A, and the number Na of receiving antennas is not limited to three elements illustrated in FIG. 9A. Furthermore, according to the present disclosure, the arrangement of the transmitting and receiving array antennas is not limited to that illustrated in FIGS. 9A and 9B (the virtual receiving array arrangement). The present disclosure is applicable to a virtual receiving array in which the transmitting and receiving array antennas are arranged two-dimensionally in the horizontal direction and the vertical direction.

(2) While the above embodiment has been described with reference to the case of using a coded pulse radar, the present disclosure is further applicable to a radar system using a frequency-modulated pulse wave, such as a Chirp radar.

(3) While the above embodiment has been described with reference to an example in which target height estimation and target width estimation are performed by using the virtual receiving array determined by the arrangement of the transmitting and receiving array antennas of a MIMO radar, the present disclosure is not limited thereto. The present disclosure is further applicable to the case in which target height estimation and target width estimation are performed by using a single transmitting antenna and a plurality of receiving array antennas arranged two-dimensionally in the horizontal direction and the vertical direction. In addition, the present disclosure is applicable to the case in which target height estimation and target width estimation are performed by using a single transmitting antenna and a plurality of receiving array antennas arranged in the vertical direction.

(4) In the radar apparatus 10 illustrated in FIG. 4, the radar transmission unit 100 and the radar reception unit 200 may be disposed at physically separate places. Furthermore, in the radar reception unit 200 illustrated in FIG. 4, the position estimation processing unit 214 (the position estimation apparatus) may be disposed at a physically separate place from other constituent elements.

(5) Although not illustrated, the radar apparatus 10 includes, for example, a central processing unit (CPU), a storage medium storing a control program, such as a read only memory (ROM), and a working memory, such as a random access memory (RAM). In this case, the functions of the above-described units are achieved by the CPU executing the control program. It is to be understood that the hardware configuration of the radar apparatus 10 is not limited to the above-described examples. For example, each of the functional units of the radar apparatus 10 may be implemented by using an integrated circuit (IC). Each of the functional units may be implemented as a single chip. Alternatively, some or all of the functional units may be integrated into a single chip.

While various embodiments have been described with reference to the accompanying drawings, the present disclosure is not limited to the embodiments. It is understood that those skilled in the art will recognize that the present disclosure can be practiced with various modifications or changes within the spirit and scope of the disclosure, and the modifications or changes are encompassed within the technical scope of the present disclosure. In addition, the constituent elements of the above-described embodiments may be combined in any way within the spirit and scope of the disclosure.

SUMMARY OF PRESENT DISCLOSURE

A radar apparatus according to the present disclosure includes a transmission unit that transmits a radar signal by using at least one transmitting antenna, a reception unit that receives the reflected wave signal which is the radar signal reflected by the target by using a plurality of receiving antennas, and an estimation processing unit that estimates the position of the target by using the received reflected wave signal. The estimation processing unit includes an extraction unit, a detection unit, and an estimation unit. The extraction unit extracts, by using the reflected wave signal of a linear array composed of receiving antennas linearly arranged in a first direction among the plurality of receiving antennas, the angle of arrival of the reflected wave signal in the first direction. The detection unit detects an angle spread in the first direction around the angle of arrival by using the reflected wave signal of the linear array, and the estimation unit estimates the position of the target in the first direction by using the angle of arrival and the angle spread.

According to the radar apparatus of the present disclosure, the extraction unit extracts, as the angle of arrival, NW maximum likelihood angles (NW is an integer greater than or equal to 1) in the first direction corresponding to a maximum likelihood value calculated in a maximum likelihood estimation process performed for the first direction, and the detection unit extracts NW extremum angles corresponding to at least one extremum including the maximum likelihood value of an evaluation function used in the maximum likelihood estimation process and calculates the angle spread on a basis of a distribution of the extremum angles in the first direction around the maximum likelihood angle.

According to the radar apparatus of the present disclosure, the first direction is a vertical direction, and the extraction unit calculates, as the angle of arrival, a depression angle estimation value of the reflected wave signal, and the estimation unit estimates the height of the target by using the depression angle estimation value and the angle spread.

According to the radar apparatus of the present disclosure, the first direction is a horizontal direction. The extraction unit calculates, as the angle of arrival, an azimuth angle estimation value of the reflected wave signal, and the estimation unit estimates the width of the target by using the azimuth angle estimation value and the angle spread.

According to the radar apparatus of the present disclosure, if a direction perpendicular to the first direction is not parallel to the surface of a road extending between the radar apparatus and the target, the estimation unit corrects the position of the target on a basis of a slope angle of the road.

According to the present disclosure, the radar apparatus further includes a classification unit that classifies the target into any one of a plurality of groups on the basis of the estimated position of the target.

The present disclosure provides a position estimation apparatus for estimating a position of a target by using a reflected wave signal which is a radar signal reflected by the target and received by a plurality of receiving antennas. The position estimation apparatus includes an extraction unit that extracts an angle of arrival of the reflected wave signal in the first direction by using the reflected wave signal of a linear array composed of receiving antennas linearly arranged in a first direction among the plurality of receiving antennas, a detection unit that detects an angle spread in the first direction around the angle of arrival by using the reflected wave signal of the linear array, and an estimation unit that estimates the position of the target in the first direction by using the angle of arrival and the angle spread.

The present disclosure provides a position estimation method for receiving a reflected wave signal which is a radar signal reflected by a target by using a plurality of receiving antennas and estimating a position of the target by using the received reflected wave signal. The position estimation method includes extracting, by using the reflected wave signal of a linear array composed of receiving antennas linearly arranged in a first direction among the plurality of receiving antennas, an angle of arrival of the reflected wave signal in the first direction, detecting an angle spread in the first direction around the angle of arrival by using the reflected wave signal by using the reflected wave signal of the linear array, and estimating the position of the target in the first direction by using the angle of arrival and the angle spread.

The present disclosure can be implemented by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LS Is as a result of the advancement of semiconductor technology or other derivative technology, the functional blocks could be integrated using the future integrated circuit technology. Biotechnology can also be applied.

The present disclosure is applicable to a radar apparatus that detects a target in a wide angle range.

What is claimed is:

1. A radar apparatus comprising:
a plurality of receiving antennas including an array of the receiving antennas arranged in a first direction, wherein the array of the receiving antennas receives a reflected wave signal that is a radar signal reflected by a target; and
a processor configured to:
extract, by using the reflected wave signal, an angle of arrival of the reflected wave signal, the angle of arrival being one or more maximum likelihood angles corresponding to a maximum likelihood value of an evaluation function used in a maximum likelihood estimation process for the first direction;
detect an angle spread of the reflected wave signal with respect to the angle of arrival, the angle spread is determined based on a distribution of one or more extremum angles with respect to the one or more maximum likelihood angles, the one or more extremum angles corresponding to one or more extremum of the evaluation function; and
estimate a position of the target in the first direction by using the angle of arrival and the angle spread.

2. The radar apparatus according to claim 1, wherein the first direction is a vertical direction, and wherein the processor is configured to calculate, as the angle of arrival, a depression angle estimation value of the reflected wave signal, and estimate a height of the target by using the depression angle estimation value and the angle spread.

3. The radar apparatus according to Cairn 1, wherein the first direction is a horizontal direction, and wherein the processor is configured to calculate, as the angle of arrival, an azimuth angle estimation value of the reflected wave signal, and estimate a width of the target by using the azimuth angle estimation value and the angle spread.

4. The radar apparatus according to claim 1, wherein if a direction perpendicular to the first direction is not parallel to a surface of a road extending between the radar apparatus and the target, the processor corrects the position of the target on a basis of a slope angle of the road.

5. The radar apparatus according to claim 1, wherein the processor is configured to classify the target into any one of a plurality of groups on a basis of the estimated position of the target.

6. A position estimation apparatus for estimating a position of a target by using a reflected wave signal that is a radar signal reflected by the target and received by a linear array of receiving antennas arranged in a first direction among a plurality of receiving antennas, the position estimation apparatus comprising:
a processor; and
a memory coupled to the processor, wherein, using the memory, the processor, operates to:
extract an angle of arrival of the reflected wave signal, the angle of arrival being one or more maximum likelihood angles corresponding to a maximum likelihood value of an evaluation function used in a maximum likelihood estimation process for the first direction;
detect an angle spread of the reflected wave signal with respect to the angle of arrival, the angle spread is determined based on a distribution of one or more extremum angles with respect to the one or more maximum likelihood angles, the one or more extremum angles corresponding to one or more extremum of the evaluation function; and
estimate the position of the target in the first direction by using the angle of arrival and the angle spread.

7. A position estimation method for estimating a position of a target by using a received reflected wave signal that is a radar signal reflected by the target and received by a linear array of receiving antennas arranged in a first direction among a plurality of receiving antennas, the method comprising:
extracting, by using the reflected wave signal, an angle of arrival of the reflected wave signal, the angle of arrival being one or more maximum likelihood angles corresponding to a maximum likelihood value of an evaluation function used in a maximum likelihood estimation process for the first direction;
detecting an angle spread of the reflected wave signal with respect to the angle of arrival, the angle spread is determined based on a distribution of one or more extremum angles with respect to the one or more maximum likelihood angles, the one or more extremum angles corresponding to one or more extremum of the evaluation function; and
estimating the position of the target in the first direction by using the angle of arrival and the angle spread.

* * * * *